United States Patent

Sandretto

[19]

[11] Patent Number: 5,812,988
[45] Date of Patent: Sep. 22, 1998

[54] METHOD AND SYSTEM FOR JOINTLY ESTIMATING CASH FLOWS, SIMULATED RETURNS, RISK MEASURES AND PRESENT VALUES FOR A PLURALITY OF ASSETS

[75] Inventor: Michael J. Sandretto, Granger, Ind.

[73] Assignee: Investments Analytic, Inc., Granger, Ind.

[21] Appl. No.: 418,111

[22] Filed: Apr. 6, 1995

Related U.S. Application Data

[63] Continuation-in-part of Ser. No. 162,540, Dec. 6, 1993, abandoned.

[51] Int. Cl.⁶ .................................................. H01J 13/00
[52] U.S. Cl. .......................... 705/36; 395/235; 395/236; 364/408; 364/407; 364/401; 705/35; 705/10
[58] Field of Search ........................ 395/236, 235; 364/408, 407, 401; 700/36, 35; 705/35, 36, 10

[56] References Cited

U.S. PATENT DOCUMENTS

| | | | |
|---|---|---|---|
| 4,648,038 | 3/1987 | Roberts et al. | 364/408 |
| 4,839,804 | 6/1989 | Roberts et al. | 364/408 |
| 4,953,085 | 8/1990 | Atkins | 364/408 |
| 5,126,936 | 6/1992 | Champion et al. | 364/408 |
| 5,148,365 | 9/1992 | Dembo | 364/402 |
| 5,262,942 | 11/1993 | Earle | 364/408 |
| 5,446,885 | 8/1995 | Moore et al. | 395/600 |
| 5,537,524 | 7/1996 | Aprile | 395/140 |

*Primary Examiner*—Amelia Au
*Attorney, Agent, or Firm*—Foley & Lardner

[57] ABSTRACT

Methods and apparatus for: (1) inputting economic variables expected to influence future asset values and asset-specific variables; (2) estimating financial statements, future asset values, and tentative asset NPVs using estimated economic variables and estimated asset-specific variables; (3) estimating different financial statements, future asset values and current asset NPVs assuming different estimates of the economic variables that affect asset values; and (4) processes to: (a) equate; or (2) reduce to acceptably small numbers the differences between: (i) the risk measures, terminal values, default premiums, and risk premiums used to determine current values, and (ii) risk measures, terminal values, default premiums, and risk premiums implied by the estimates of economic and firm-specific variables.

23 Claims, 13 Drawing Sheets

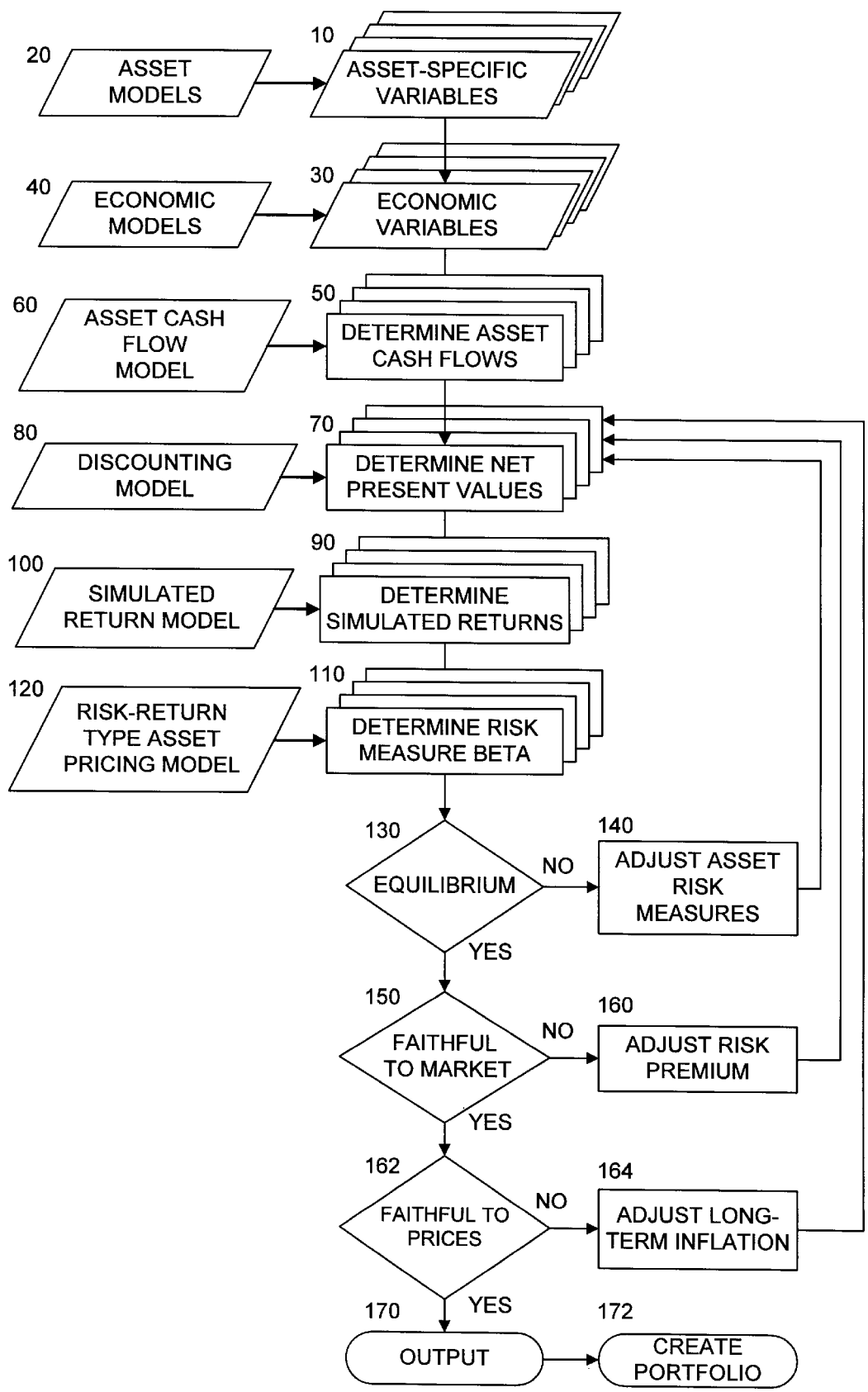

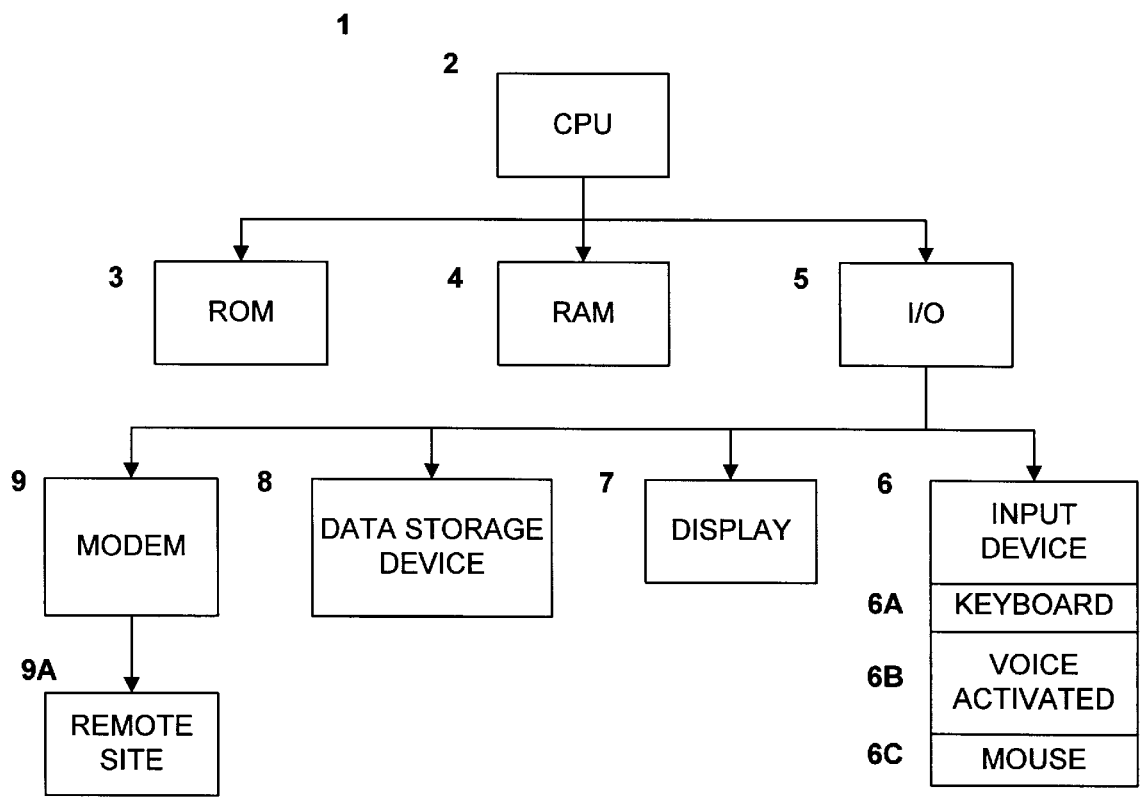

FIG. 6

| 830 | ECONOMIC VARIABLES: | | AUGUST | 1991 | | |
|---|---|---|---|---|---|---|
| | ANNUAL Rf: | 0.05 | | EST # | 6-MO. INFL | Rf/INFL | RPREM |
| | INITIAL 6-MO. RPREM: | 0.013 | | 0 | 0.015382 | 0.0091723 | 0.013 |
| | CURR ANNUAL INFL: | 0.031 | | 1 | 0.020382 | 0.0091723 | 0.013 |
| | YRS FOR CURR INFL: | 2 | | 2 | 0.025382 | 0.0091723 | 0.013 |
| | 6-MO CHANGE--INFL: | -0.002 | | 3 | 0.018382 | 0.0091723 | 0.013 |
| | CHANGE UNTIL YR: | 5 | | 4 | 0.012382 | 0.0091723 | 0.013 |
| | | | | 5 | 0.010382 | 0.0091723 | 0.013 |

| 840 | ASSET-SPECIFIC VARIABLES: | | AUGUST | 1991 | |
|---|---|---|---|---|---|
| | YRS TO MAT: | 2 | 3 | 6 | 10 | INDEX |
| | MATURE: AUGUST | 1993 | 1994 | 1997 | 2001 | |
| | COUPON RATE: | 0.08625 | 0.0825 | 0.0825 | 0.13375 | |
| | BID-ASK MID: | 104.08 | 105.14 | 105.23 | 137.14 | |

| 850 | BETAS: | INPUT | 1 | 1 | 1 | 1 |
|---|---|---|---|---|---|---|
| | | OUTPUT | 0.452482 | 0.652318 | 1.158163 | 1.525918 |
| | | DIFF: | 0.547518 | 0.347682 | -0.158163 | -0.525918 |
| | | DISC RATE: | 0.022172 | 0.022172 | 0.022172 | 0.022172 |

| 860 | NPVs: | 0 | 101907.88 | 101854.06 | 103993.3 | 142154 | 449909.26 |
|---|---|---|---|---|---|---|---|
| | | 1 | 100042.93 | 99168.888 | 99137.36 | 133434.6 | 431783.74 |
| | | 2 | 98222.175 | 96571.269 | 94559.85 | 125432 | 414785.32 |
| | | 3 | 100783.53 | 100232.26 | 101045.3 | 136832.4 | 438893.42 |
| | | 4 | 103048.6 | 103508.61 | 107048.4 | 147760.3 | 461365.89 |
| | | 5 | 103818.33 | 104630.22 | 109146.7 | 151664.5 | 469259.76 |

| 870 | RETURNS | 1 | -0.0183 | -0.026363 | -0.046695 | -0.061338 | -0.040287 |
|---|---|---|---|---|---|---|---|
| | | 2 | -0.036167 | -0.051866 | -0.090712 | -0.117633 | -0.078069 |
| | | 3 | -0.011033 | -0.015923 | -0.028348 | -0.037436 | -0.024485 |
| | | 4 | 0.011194 | 0.016244 | 0.029378 | 0.039438 | 0.025464 |
| | | 5 | 0.018747 | 0.027256 | 0.049555 | 0.066903 | 0.04301 |

| 880 | MARKET VALUES: | 104250.0 | 105437.5 | 105718.8 | 137437.5 | |
|---|---|---|---|---|---|---|
| | NPV0 - MKT VALUE: | -2342.12 | -3583.44 | -1725.46 | 4716.54 | -2934.49 |
| | ABS DIFF: | 2342.12 | 3583.44 | 1725.46 | 4716.54 | 12367.57 |

| 890 PERIOD | INFLATION-ADJUSTED CASH FLOWS | | | | 900 EST INFL | CUM INFL |
|---|---|---|---|---|---|---|
| 1 | 4247.2 | 4062.5 | 4062.5 | 6586.2 | 1.538% | 1.538% |
| 2 | 4182.8 | 4001.0 | 4001.0 | 6486.4 | 1.538% | 3.100% |
| 3 | 4119.5 | 3940.4 | 3940.4 | 6388.2 | 1.538% | 4.686% |
| 4 | 98133.9 | 3880.7 | 3880.7 | 6291.4 | 1.538% | 6.296% |
| 5 | 0.0 | 3823.1 | 3823.1 | 6198.1 | 1.505% | 7.896% |
| 6 | 0.0 | 95105.8 | 3767.7 | 6108.2 | 1.472% | 9.483% |
| 7 | 0.0 | 0.0 | 3714.3 | 6021.6 | 1.438% | 11.058% |
| 8 | 0.0 | 0.0 | 3662.8 | 5938.2 | 1.405% | 12.618% |
| 9 | 0.0 | 0.0 | 3613.3 | 5857.9 | 1.372% | 14.163% |
| 10 | 0.0 | 0.0 | 3565.6 | 5780.5 | 1.338% | 15.690% |
| 11 | 0.0 | 0.0 | 3518.5 | 5704.2 | 1.338% | 17.238% |
| 12 | 0.0 | 0.0 | 87641.9 | 5628.9 | 1.338% | 18.807% |
| 13 | 0.0 | 0.0 | 0.0 | 5554.5 | 1.338% | 20.397% |
| 14 | 0.0 | 0.0 | 0.0 | 5481.2 | 1.338% | 22.008% |
| 15 | 0.0 | 0.0 | 0.0 | 5408.8 | 1.338% | 23.641% |
| 16 | 0.0 | 0.0 | 0.0 | 5337.4 | 1.338% | 25.296% |
| 17 | 0.0 | 0.0 | 0.0 | 5266.9 | 1.338% | 26.972% |
| 18 | 0.0 | 0.0 | 0.0 | 5197.4 | 1.338% | 28.671% |
| 19 | 0.0 | 0.0 | 0.0 | 5128.7 | 1.338% | 30.393% |
| 20 | 0.0 | 0.0 | 0.0 | 80739.4 | 1.338% | 32.138% |

FIG. 7

| 910 ECONOMIC VARIABLES: | AUGUST | 1991 | | | |
|---|---|---|---|---|---|
| ANNUAL Rf: | 0.05 | EST # | 6-MO. INFL | Rf/INFL | RPREM: |
| INITIAL 6-MO RPREM: | 0.013 | 0 | 0.015382 | 0.009172 | 0.013 |
| CURR ANNUAL INFL: | 0.031 | 1 | 0.020382 | 0.009172 | 0.013 |
| YRS FOR CURR INFL: | 2 | 2 | 0.025382 | 0.009172 | 0.013 |
| 6-MO CHANGE--INFL: | -0.002 | 3 | 0.018382 | 0.009172 | 0.013 |
| CHANGE UNTIL YR: | 5 | 4 | 0.012382 | 0.009172 | 0.013 |
| | | 5 | 0.010382 | 0.009172 | 0.013 |

| 920 ASSET-SPECIFIC VARIABLES: | | AUGUST | 1991 | |
|---|---|---|---|---|
| YRS TO MAT: | 2 | 3 | 6 | 10 | INDEX |
| MATURE: AUGUST | 1993 | 1994 | 1997 | 2001 | |
| COUPON RATE: | 0.08625 | 0.0825 | 0.0825 | 0.13375 | |
| BID-ASK MID: | 104.08 | 105.14 | 105.23 | 137.14 | |

| 930 BETAS: | INPUT | 0.4677781 | 0.6746562 | 1.1924138 | 1.537361 |
|---|---|---|---|---|---|
| | OUTPUT | 0.4677778 | 0.6746556 | 1.1924123 | 1.53736 |
| | DIFF: | 2.897E-07 | 6.153E-07 | 1.518E-06 | 1.28E-06 |
| | DISC RATE: | 0.0152534 | 0.0179428 | 0.0246737 | 0.029158 |

| 940 NPVs: | 0 | 104545.95 | 104180.19 | 101546.08 | 130261.7 | 440533.9 |
|---|---|---|---|---|---|---|
| | 1 | 102630.99 | 101430.05 | 96819.494 | 122467.1 | 423347.7 |
| | 2 | 100761.44 | 98769.605 | 92363.644 | 115307.2 | 407201.9 |
| | 3 | 103391.45 | 102519.14 | 98676.632 | 125505.3 | 430092.6 |
| | 4 | 105717.26 | 105874.8 | 104519.63 | 135269.9 | 451381.6 |
| | 5 | 106507.64 | 107023.57 | 106561.93 | 138756.2 | 458849.3 |

| 950 RETURNS | 1 | -0.018317 | -0.026398 | -0.046546 | -0.059838 | -0.039012 |
|---|---|---|---|---|---|---|
| | 2 | -0.036199 | -0.051935 | -0.090426 | -0.114804 | -0.075663 |
| | 3 | -0.011043 | -0.015944 | -0.028258 | -0.036514 | -0.023702 |
| | 4 | 0.011204 | 0.016266 | 0.029283 | 0.038447 | 0.024624 |
| | 5 | 0.018764 | 0.027293 | 0.049395 | 0.065211 | 0.041575 |

| 960 MARKET VALUES: | 104250.0 | 105437.5 | 105718.8 | 137437.5 | |
|---|---|---|---|---|---|
| NPV0 - MKT VALUE: | 295.95 | -1257.31 | -4172.67 | -7175.78 | -12309.81 |
| ABS DIFF: | 295.95 | 1257.31 | 4172.67 | 7175.78 | 12901.71 |

| 970 PERIOD | INFLATION-ADJUSTED CASH FLOWS | | | | 980 EST INFL | CUM INFL |
|---|---|---|---|---|---|---|
| 1 | 4247.2 | 4062.5 | 4062.5 | 6586.2 | 1.538% | 1.538% |
| 2 | 4182.8 | 4001.0 | 4001.0 | 6486.4 | 1.538% | 3.100% |
| 3 | 4119.5 | 3940.4 | 3940.4 | 6388.2 | 1.538% | 4.686% |
| 4 | 98133.9 | 3880.7 | 3880.7 | 6291.4 | 1.538% | 6.296% |
| 5 | 0.0 | 3823.1 | 3823.1 | 6198.1 | 1.505% | 7.896% |
| 6 | 0.0 | 95105.8 | 3767.7 | 6108.2 | 1.472% | 9.483% |
| 7 | 0.0 | 0.0 | 3714.3 | 6021.6 | 1.438% | 11.058% |
| 8 | 0.0 | 0.0 | 3662.8 | 5938.2 | 1.405% | 12.618% |
| 9 | 0.0 | 0.0 | 3613.3 | 5857.9 | 1.372% | 14.163% |
| 10 | 0.0 | 0.0 | 3565.6 | 5780.5 | 1.338% | 15.690% |
| 11 | 0.0 | 0.0 | 3518.5 | 5704.2 | 1.338% | 17.238% |
| 12 | 0.0 | 0.0 | 87641.9 | 5628.9 | 1.338% | 18.807% |
| 13 | 0.0 | 0.0 | 0.0 | 5554.5 | 1.338% | 20.397% |
| 14 | 0.0 | 0.0 | 0.0 | 5481.2 | 1.338% | 22.008% |
| 15 | 0.0 | 0.0 | 0.0 | 5408.8 | 1.338% | 23.641% |
| 16 | 0.0 | 0.0 | 0.0 | 5337.4 | 1.338% | 25.296% |
| 17 | 0.0 | 0.0 | 0.0 | 5266.9 | 1.338% | 26.972% |
| 18 | 0.0 | 0.0 | 0.0 | 5197.4 | 1.338% | 28.671% |
| 19 | 0.0 | 0.0 | 0.0 | 5128.7 | 1.338% | 30.393% |
| 20 | 0.0 | 0.0 | 0.0 | 80739.4 | 1.338% | 32.138% |

FIG. 8

| 990 | ECONOMIC VARIABLES: | AUGUST | 1991 | | | |
|---|---|---|---|---|---|---|
| | ANNUAL Rf: | 0.05 | EST # | 6-MO. INFL | Rf/INFL | RPREM: |
| | INITIAL 6-MO RPREM: | 0.013 | 0 | 0.015382 | 0.0091723 | 0.0102 |
| | CURR ANNUAL INFL: | 0.031 | 1 | 0.020382 | 0.0091723 | 0.0102 |
| | YRS FOR CURR INFL: | 2 | 2 | 0.025382 | 0.0091723 | 0.0102 |
| | 6-MO CHANGE--INFL: | -0.002 | 3 | 0.018382 | 0.0091723 | 0.0102 |
| | CHANGE UNTIL YR: | 5 | 4 | 0.012382 | 0.0091723 | 0.0102 |
| | | | 5 | 0.010382 | 0.0091723 | 0.0102 |

| 1000 | ASSET-SPECIFIC VARIABLES: | | AUGUST | 1991 | |
|---|---|---|---|---|---|
| | YRS TO MAT: | 2 | 3 | 6 | 10 | INDEX |
| | MATURE: AUGUST | 1993 | 1994 | 1997 | 2001 | |
| | COUPON RATE: | 0.08625 | 0.0825 | 0.0825 | 0.13375 | |
| | BID-ASK MID: | 104.08 | 105.14 | 105.23 | 137.14 | |

| 1010 BETAS: | INPUT | 0.4599471 | 0.6636579 | 1.1774646 | 1.534977 |
|---|---|---|---|---|---|
| | OUTPUT | 0.4599476 | 0.6636583 | 1.1774651 | 1.534977 |
| | DIFF: | -5.46E-07 | -4.39E-07 | -5.37E-07 | -6.51E-08 |
| | DISC RATE: | 0.0138637 | 0.0159416 | 0.0211824 | 0.024829 |

| 1020 NPVs: | 0 | 105086.48 | 105303.82 | 104981.82 | 137463.1 | 452835.2 |
|---|---|---|---|---|---|---|
| | 1 | 103161.28 | 102522.28 | 100073.61 | 129109.6 | 434866.72 |
| | 2 | 101281.72 | 99831.48 | 95446.925 | 121440.4 | 418000.48 |
| | 3 | 103925.81 | 103623.81 | 102002.06 | 132365.1 | 441916.74 |
| | 4 | 106264.07 | 107017.78 | 108069.85 | 142832.7 | 464184.4 |
| | 5 | 107058.67 | 108179.68 | 110190.86 | 146571.5 | 472000.69 |

| 1030 RETURNS | 1 | -0.01832 | -0.026414 | -0.046753 | -0.060769 | -0.03968 |
|---|---|---|---|---|---|---|
| | 2 | -0.036206 | -0.051967 | -0.090824 | -0.11656 | -0.076926 |
| | 3 | -0.011045 | -0.015954 | -0.028384 | -0.037086 | -0.024111 |
| | 4 | 0.011206 | 0.016276 | 0.029415 | 0.039062 | 0.025063 |
| | 5 | 0.018767 | 0.02731 | 0.049618 | 0.066261 | 0.042323 |

| 1040 MARKET VALUES: | 104250.0 | 105437.5 | 105718.8 | 137437.5 | |
|---|---|---|---|---|---|
| NPV0 - MKT VALUE: | 836.48 | -133.68 | -736.93 | 25.58 | -8.55 |
| ABS DIFF: | 836.48 | 133.68 | 736.93 | 25.58 | 1732.67 |

| 1050 PERIOD | INFLATION-ADJUSTED CASH FLOWS | | | | 1060 EST INFL | CUM INFL |
|---|---|---|---|---|---|---|
| 1 | 4247.2 | 4062.5 | 4062.5 | 6586.2 | 1.538% | 1.538% |
| 2 | 4182.8 | 4001.0 | 4001.0 | 6486.4 | 1.538% | 3.100% |
| 3 | 4119.5 | 3940.4 | 3940.4 | 6388.2 | 1.538% | 4.686% |
| 4 | 98133.9 | 3880.7 | 3880.7 | 6291.4 | 1.538% | 6.296% |
| 5 | 0.0 | 3823.1 | 3823.1 | 6198.1 | 1.505% | 7.896% |
| 6 | 0.0 | 95105.8 | 3767.7 | 6108.2 | 1.472% | 9.483% |
| 7 | 0.0 | 0.0 | 3714.3 | 6021.6 | 1.438% | 11.058% |
| 8 | 0.0 | 0.0 | 3662.8 | 5938.2 | 1.405% | 12.618% |
| 9 | 0.0 | 0.0 | 3613.3 | 5857.9 | 1.372% | 14.163% |
| 10 | 0.0 | 0.0 | 3565.6 | 5780.5 | 1.338% | 15.690% |
| 11 | 0.0 | 0.0 | 3518.5 | 5704.2 | 1.338% | 17.238% |
| 12 | 0.0 | 0.0 | 87641.9 | 5628.9 | 1.338% | 18.807% |
| 13 | 0.0 | 0.0 | 0.0 | 5554.5 | 1.338% | 20.397% |
| 14 | 0.0 | 0.0 | 0.0 | 5481.2 | 1.338% | 22.008% |
| 15 | 0.0 | 0.0 | 0.0 | 5408.8 | 1.338% | 23.641% |
| 16 | 0.0 | 0.0 | 0.0 | 5337.4 | 1.338% | 25.296% |
| 17 | 0.0 | 0.0 | 0.0 | 5266.9 | 1.338% | 26.972% |
| 18 | 0.0 | 0.0 | 0.0 | 5197.4 | 1.338% | 28.671% |
| 19 | 0.0 | 0.0 | 0.0 | 5128.7 | 1.338% | 30.393% |
| 20 | 0.0 | 0.0 | 0.0 | 80739.4 | 1.338% | 32.138% |

| PERIOD: | 1 | 2 | 3 | | | t |
|---|---|---|---|---|---|---|
| INCOME STATEMENT | | | | | | |
| REVENUE | | | | | | |
|    - VARIABLE COSTS | | | | | | |
|    - FIXED COSTS | | | | | | |
| OPERATING INCOME | | | | | | |
|    - INTEREST INCOME/EXPENSE | | | | | | |
|    - INCOME TAXES | | | | | | |
| NET INCOME | | | | | | |

| PERIOD: | 0 | 1 | 2 | 3 | | | t |
|---|---|---|---|---|---|---|---|
| BALANCE SHEET | | | | | | | |
| ASSETS: | | | | | | | |
|    CURRENT ASSETS | | | | | | | |
|    FIXED ASSETS | | | | | | | |
|    TOTAL ASSETS | | | | | | | |
| | | | | | | | |
| LIABILITIES: | | | | | | | |
|    CURRENT LIABILITIES | | | | | | | |
|    LONG-TERM LIABILITIES | | | | | | | |
|    TOTAL LIABILITIES | | | | | | | |
| EQUITY: | | | | | | | |
|    PAID-IN CAPITAL | | | | | | | |
|    RETAINED EARNINGS | | | | | | | |
|    TOTAL EQUITY | | | | | | | |
| TOTAL EQUITY + LIABILITIES | | | | | | | |

| PERIOD: | 1 | 2 | 3 | | | t |
|---|---|---|---|---|---|---|
| STATEMENT OF CASH FLOWS | | | | | | |
| CASH FLOWS FROM OPERATIONS | | | | | | |
|   DETAILS | | | | | | |
| CASH FLOWS FROM INVESTING | | | | | | |
|   DETAILS | | | | | | |
| CASH FLOWS FROM FINANCING | | | | | | |
|   CASH DIVIDENDS | | | | | | |
|   OTHER DETAIL CASH FLOWS | | | | | | |
| NET CHANGE IN CASH AND EQUIVALENTS | | | | | | |

| PERIOD: | 0 | 1 | 2 | 3 | | | t |
|---|---|---|---|---|---|---|---|
| CASH FLOW TO INVESTORS | | | | | | | |
|   CASH DIVIDENDS | | X | X | X | X | X | X |
|   VALUE OF TERMINAL EQUITY | | | | | | | X |
|   TOTAL CASH FLOWS TO INVESTORS | | X | X | X | X | X | X |
|   TOTAL CASH FLOWS ADJUSTED FOR INFLATION | | X | X | X | X | X | X |
| NET PRESENT VALUE (NPV) OF INFLATION-ADJUSTED CASH FLOWS | X | | | | | | |

METHOD AND SYSTEM FOR JOINTLY ESTIMATING CASH FLOWS, SIMULATED RETURNS, RISK MEASURES AND PRESENT VALUES FOR A PLURALITY OF ASSETS

This application is a continuation-in-part of application Ser. No. 08/162,540, filed Dec. 6, 1993, now abandoned.

BACKGROUND OF THE INVENTION

1. Field of the Invention

The present invention relates to computer implemented processes for estimating simulated returns, asset values and risk measures using estimated financial variables pertaining to an asset, such as economic variables and asset-specific characteristics.

2. Description of Related Art

There are numerous publications directed to financial risk analysis. Some of these papers will be referenced in the discussion below.

BIBLIOGRAPHY

Banz, Rolf W., 1981, The Relationship Between Returns and Market Value of Common Stocks, *Journal of Financial Economics* 9, 3–18.

Basu, Sanjoy, 1983, The Relationship Between Earnings Yield, Market Value, and Return for NYSE Common Stocks: Further Evidence, *Journal of Financial Economics* 12, 129–56.

Bhandari, Laxmi Chand, 1988, Debt/Equity Ration and Expected Common Stock Returns: Empirical Evidence, *Journal of Finance* 43, 507–28.

Black, Fischer, Emanuel Derman and William Toy, 1990, A One-Factor Model of Interest Rates and Its Application to Treasury Bond Options, *Financial Analysts Journal* January–February, 33–40.

Black, Fischer, and Piotr Karasinski, 1991, Bond Option Pricing when Short Rates are Lognormal, *Financial Analysts Journal* July–August, 52–59.

Chen, Ren-Raw and Louis Scott, 1993, Maximum Likelihood Estimation for a Multifactor Equilibrium Model of the Term Structure of Interest Rates, The Journal of Fixed Income 3, 14–31.

Cox, John C., Jonathan E. Ingersoll, Jr., and Stephen A. Ross, 1985a, An Intertemporal General Equilibrium Model of Asset Prices, *Econometrica* 53, 363–384.

Cox, John C., Jonathan E. Ingersoll, Jr., 1985b, A Theory of the Term Structure of Interest Rates, Econometrica 53, 363–384.

Fama, Eugene F., 1975, Short-Term Interest Rates as Predictors of Inflation, *Journal of Finance* 65, 269–282.

Fama, Eugene F. and Kenneth R. French, 1992, The Cross-Section of Expected Stock Returns, *The Journal of Finance* 47, 427–465.

Fama, Eugene F. and Kenneth R. French, 1993, Common Risk Factors in the Returns on Stocks and Bonds, Journal of Financial Economics 33, 3–56.

Fama, Eugene F. and Michael R. Gibbons, 1984, A Comparison of Inflation Forecasts, *Journal of Monetary Economics*, 13, 327–348.

Grossman, Sanford J. and Joseph E. Stiglitz, 1980, On the Impossibility of Informationally Efficient markets, *The American Economic Review* 70, 393–408.

Lintner, John, 1965, The Valuation of Risk Assets and the Selection of Risky Investments in Stock Portfolios and Capital Budgets, *Review of Economics and Statistics* 47, 13–37.

Pearson, Neil D. and Tong-Sheng Sun, 1994, Exploiting the Conditional Density in Estimating the Term Structure: An Application to the Cox, Ingersoll, and Ross Model, 49, 1279–1304.

Press, William H., Brian P. Flannery, Saul A. Teukolsky, and William T. Vetterling, *Numerical Recipes in C: The art of Scientific Computing,* 1988, (Cambridge University Press, New York).

Roll, Richard, 1977, A Critique of the Asset Pricing Theory's Tests, *Journal of Financial Economics* 4, 129–176.

Roll, Richard, 1988, $R^2$, *The Journal of Finance* 43, 541–566.

Roll, Richard and Stephen A. Ross, 1994, On the Cross-sectional Relation between Expected Returns and Betas, *The Journal of Finance* 49, 101–121.

Ross, Stephen A., 1976, The Arbitrage Theory of Capital Asset Pricing, *Journal of Economic Theory* 13, 341–360.

Sharpe, William F., 1964, Capital Asset Prices: A Theory of Market Equilibrium under Conditions of Risk, *Journal of Finance* 19, 425–442.

Financial analysts, investors, business persons, brokers, investment bankers, and others (hereinafter analysts) routinely estimate asset values. Such assets include, but are not limited to: equipment, real estate, debt instruments (e.g., bonds or notes), portions of companies, entire companies, and common stock or other classes of securities issued by companies or of other asset classes or derivatives of asset classes issued by investment firms.

Many known processes exist for estimating asset values. They can broadly be grouped as: (1) value-based processes, and (2) earnings or cash-flow based processes.

Value-based processes usually estimate values for an asset's separable parts. One value based process estimates the current market selling prices of an asset's separable parts. For example, if an owner receives a purchase-offer for an entire firm, one test of the reasonableness of the offer is whether a higher price can be obtained by selling the firm's separable parts. Another value-based process begins with original purchase prices for a firm's individual assets. Each asset's original cost is then adjusted for usage and estimated price changes since the acquisition date.

In contrast, earnings or cash-flow based valuation processes attempt to value an asset's projected future earnings or future cash-flows (the two are not equivalent, but estimated future earnings are often used to estimate future cash flows). Those processes usually apply the rule that a dollar today is worth more than a dollar in the future. Each asset's estimated earnings or cash flows are discounted at some rate (interest rate or discount rate) to determine the asset's current value, also referred to as present value or net present value (NPV). The cash flow/earnings valuation process consists of three separate and distinct parts: (1) estimate an asset's future earnings, cash flows, or earnings and cash flows; (2) estimate the discount rate (statistical methods and experience-based estimates are commonly used); and (3) discount the estimated future earnings or cash flows at the discount rate.

This invention deals with the earnings or cash-flow class of valuation processes, and therefore the balance of this background relates to such processes. It is highly preferable to discount estimated cash flows rather than to discount estimated earnings. The present invention may, however, be applied to either method.

There are many ways to estimate an asset's future earnings and future cash flows. Analysts typically estimate revenues and costs associated with an asset. An analyst may estimate that during the following year a firm's revenue will be $10,000,000 while its expenses will be $9,000,000. Those estimates, when combined, yield an estimated income of $1,000,000. A firm's projected investments and financing can be combined with income projections to estimate cash flows.

Estimated revenues, costs, and cash flows often depend on predicted economic conditions such as economy-wide or industry-specific growth rates, interest rates, specific price changes, and general inflation. There are countless ways to estimate economic variables and combine them with asset-specific assumptions to estimate an asset's earnings and cash flows. To an extent, the choice of an estimating process is a matter of personal preference, although some processes are more appropriate for particular asset classes. Further, the particular process is often less important than is an analyst's skill and effort. Although many processes are available to estimate an asset's earnings and cash flows, they may be misapplied by unskilled analysts.

As will be understood, an important feature of this invention is that it may be advantageously practiced with a wide range of earnings and cash-flow estimating processes. More specifically, this invention relates to an iterative process to estimate a discount rate for each of two or more assets. This invention relates to similar iterative processes to estimate other variables or coefficients that are useful in estimating an asset's risk or NPV. These include: (1) a risk premium for a class of assets based on the assumption that, in aggregate, that class of assets is correctly (efficiently) priced in the market; (2) an estimate of the implied long-run inflation rate used to value bonds or other assets; (3) a coefficient to estimate a firm's terminal value; (4) a risk premium or premiums for one or more asset classes based on the risk premium or premiums for one or more other asset classes; (5) a default premium for one or more specific debt issues; and (6) a general iterative process of additional variables.

Of the mentioned variables, most prior art has focused on estimating discount rates. Prior art relating to the additional five variables is either based on ad hoc rules, or on methods that are similar to prior art processes used to estimate discount rates. As will be evident, such prior art processes bear little relation to this invention regarding the additional five variables.

It is possible to estimate an asset's discount rate using qualitative judgment. For example, an analyst may wish to value a small firm at a time when 30-day U.S. Treasury bills pay a 6% annual interest rate. This rate is often referred to as the risk-free interest rate for two reasons. First, there is so little chance the U.S. Government will default that, for practical purposes, default risk is zero. Second, the interest-rate risk (a bond declines in value if interest rates rise) is very low because the bill matures in 30 days. The NPV of a Treasury bill is determined by discounting the principal payment back to the present, but the discount period is so short (30 days) that changes in the discount rate have little effect on a 30-day Treasury bill's value. Thus, for practical purposes, a 30-day Treasury bill is free of both default risk and interest-rate risk.

An analyst may use qualitative judgment to decide that when a risk-free investment pays a 6% return, an investment in the small firm should earn 14% because of numerous risks, including: (1) the firm's value may decline because of a recession; (2) the firm may be unable to compete with larger firms because it lacks technical expertise; or (3) the firm may be unable to obtain needed financing.

The judgment-based rate of 14% can be used to discount estimated future cash flows. Expected cash flows one year in the future would be divided by 1.14; expected cash flows two years in the future would be divided by $1.14^2$, while expected cash flows three years in the future would be divided by $1.14^3$.

In practice, many analysts do use judgment to estimate discount rates and many are highly successful investors and managers. Other analysts prefer a more objective process. The prior art development that has had by far the most significant influence on the field of finance was independently developed by William Sharpe and John Lintner in 1964 and 1965. That prior art developed a theoretical mathematical relation between an asset's risk and its return (on investment). The resulting risk-measure can be used to determine an asset's discount rate. The theoretical relation between an asset's risk and return is known in the prior art finance literature as the Sharpe-Lintner capital asset pricing model (CAPM):

(1) $E(\tilde{R}_i) = R_f + \beta_i \times [E(R\tilde{R}_m) - R_f]$ for i=1 ... N, where n is an integer equal to the number of assets, and where:

$E(\tilde{R}_i)$=the expected value of the return from investing in asset i $R_f$=the return from investing in a risk-free asset (typically 30-day U.S. Treasury bills)

$\beta_i$=the risk measure for firm i $E(\tilde{R}_m)$=the expected value of the return from investing in the market (typically the expected return to investing in some market index, such as the New York Stock Exchange [NYSE] Index™, or the S&P 500 Index)

Because current methods are unable to estimate the expected value of the returns for investing either in an individual asset or in an index, in practice the CAPM is implemented using the following version of equation (1):

(2) $R_{it} = R_{ft} + \beta_i \times (R_{mt} - R_{ft})$ where:

$R_{it}$=the actual return from investing in asset i during a prior period t $R_{mt}$=the actual return from investing in the market portfolio during a prior period t $R_{ft}$=the actual risk-free rate during a prior period t $\beta_i$=the slope coefficient derived by regressing $R_{it}$ against $R_{mt}$ a simplified version, sometimes referred to as the market model, is sometimes substituted for equation (2) because in practice there is little difference between the two:

(3) $R_{it} = \beta_i \times R_{mt}$

From its inception this simple linear model has been the basis for what is by far the most extensive body of academic research in the field of finance, which includes thousands of academic and applied or practical articles in the fields of finance, economics, and accounting. The CAPM is also widely used in the practice of business and finance. In both academic studies and in practice, the model is often used to estimate the risk of common stocks and possibly less often to estimate the value of common stocks. Typically the statistical method of linear regression is used to estimate an asset's risk as follows:

(1) Determine the monthly returns for a particular asset during some prior period. For example, determine the monthly returns for General Motors (GM) stock for each of the last 60 months.
(2) Determine the monthly returns for a stock index, such as the New York Stock Exchange Index (NYSE™), during the same prior periods (each of the last 60 months).
(3) Using the statistical process of ordinary least squares regression, regress the returns for GM stock against the returns for the market index. The resulting regression yields a risk measure for General Motors stock. That risk measure, the slope of the regression line, is usually called beta ($\beta$). The estimated $\beta$ can be used to estimate the discount rate for GM stock. That rate can then be used to discount estimated future cash flows; the result is GM's net present value (the estimated value of a share of GM's stock equals estimated NPV divided by the number of shares of stock outstanding).

Although the equation appears highly objective, and the previous three steps are straightforward, there is subjectivity in applying the model. First, the estimated $\beta$ depends on the time period chosen: a regression using the previous 30 months almost always produces a different $\beta$ than one using the previous 90 months. Second, it is possible to eliminate both asset and index returns for any periods with abnormal events. For example, an analyst might eliminate the return for a month when a firm's foreign subsidiary was expropriated; doing so yields a different $\beta$ than if that month's return is included in the regression. Third, the estimated $\beta$ depends on the measurement period; returns may be determined using annual returns, monthly returns, weekly returns, or daily returns. In practice, different return periods produce different $\beta$s for the same firm. Fourth, the estimated $\beta$ depends upon the choice of an index.

There are also many theoretical statistical issues that support modifications to the above regression procedure. Such modifications are often subjective and complex but usually produce minor differences in the quality of the risk measure (one method may produce significantly different $\beta$s than another, but there is little agreement that any one method is superior).

During the first twenty years after the CAPM's introduction most academic researchers and some practitioners believed that the previously described three-step process (statistical regression on prior returns) was a highly successful application of a theory (the CAPM). Many studies suggested that $\beta$ estimated by that process was valuable for estimating correct values for assets and for predicting asset prices under varying economic conditions. Many practitioners questioned the process but offered no better alternative and no convincing evidence that the process was incorrect. The research, however, is based on relatively complex mathematics.

Beginning in the mid-1980s academic researchers also began to question the validity of risk measures generated by the statistical process. By 1991 Eugene Fama and Kenneth French, two prominent finance professors, questioned whether the CAPM, as implemented through statistical regression on prior returns, had any value. An article they published in 1992 found that prior-period estimated $\beta$ had almost no ability to explain actual returns for investments in common stock. Because the risk measure is estimated by a process (statistical regression using prior returns) based on a theory (the CAPM), it has been unclear whether there are problems with the statistical process, with the theory, or with both.

As problems with the CAPM implementation became apparent, researchers spent more time testing an earlier extension to the CAPM. That extension, introduced by Stephen Ross in 1976, is called the arbitrage pricing theory (APT) in the prior art. The APT allows more than one factor to influence an asset's return. As seen in equation (1), under the CAPM, the expected return to the market, $R_{mt}$, determines an asset's expected return. The term $R_{ft}$ is also a factor, but since researchers use $R_{mt}-R_{ft}$, under current art the CAPM is called a one-factor model (Using this claimed invention, however, it would better be termed a single-index model, since this claimed process allows many economic factors to influence an asset's returns).

Although the APT allows an unlimited number of factors to influence an asset's return, in both research and in practice, the APT is usually limited to four or five factors, such as: oil prices, inflation rates, measures of commercial and industrial activity, and one or more interest rates. If the model, as applied, included two factors it would appear as follows:

(4) $R_{it}=R_{ft}+\beta_{1i}\times(i\ R_{m1t}-R_{ft})+\beta_{2i}\times(R_{m2t}-R_{ft})$ where:
  $\beta_{1i}$=risk measure with respect to factor 1 for firm i
  $\beta_{2i}$=risk measure with respect to factor 2 for firm i
  $R_{m1t}$=the average market return from investing in factor 1 during period t
  $R_{m2t}$=the average market return from investing in factor 2 during period t As with the CAPM, the APT is a theory of how asset prices should be determined; it says nothing about how the theory should be implemented. It differs from the CAPM only in that when implemented using prior returns, it allows multiple factors to influence an asset's return, which is its potential advantage (a potential advantage because sometimes additional factors reduce explanatory power).

Like the CAPM, the APT is typically implemented by applying statistical regression to returns for prior periods. Although the processes are conceptually similar, in practice the APT implementation is considerably more subjective and complex for one primary reason: it is necessary to identify not simply a factor that influences an asset's return, but also the return to investing in that factor (e.g., $R_{m1t}$ might be the average return to investing in assets influenced primarily by industrial production). Most researchers and practitioners would probably agree that methods used to implement the APT have not produced significantly better predictions than methods used to implement the CAPM. Some analysts do, however, use the APT.

Conceptually the CAPM and the APT seem like reasonable theories. Their premise is simply that investments in more-risky assets should provide higher returns than investments in less-risky assets (the relation should be linear because if it were not linear it would be possible to construct portfolios with zero risk that outperformed zero-risk Treasury bills). Given that the premise seems completely reasonable and obvious, it is very surprising that CAPM or APT results are so unsatisfactory.

Many researchers are now studying the issue. Two primary areas of their focus are: (1) methodological problems in applying statistical methods to prior returns, and; (2) the likelihood that asset risk changes from previous periods, when risk was estimated using regression, to later periods, when the model's ability to predict asset returns is tested.

Statistical methodology issues probably received most attention from finance researchers during the past two decades. As mentioned, that research probably led to only minor improvements in the quality of risk measures estimated using either the CAPM or the APT. Recently finance researchers are spending relatively more time on how risk measures change over time.

One method of avoiding changes in the risk measure is to estimate risk over the same period during which the model is tested (concurrent periods; sometimes referred to as leapfrogging). That is, the risk measure (CAPM) or measures (APT) are estimated using regression on alternate months (assume even months); those risk measures are then used to test the ability of the model to predict returns during the odd months for that particular asset. As with prior implementations of the CAPM and APT, the results indicate a weak relation between predicted and actual returns.

Another method uses statistical analysis on previous operating, financing, and accounting information. The coefficients determined through that process are used to estimate an asset's current risk given its current operating, financing, and accounting information. That estimated risk measure is sometimes averaged with a statistically estimated β based on historical returns. Because of the numerous variables that can be used, and because the process usually involves complex statistical methods, the process is subjective, difficult to implement, and difficult to interpret. The results have not been particularly successful.

In addition to these applied methods of estimating an asset's NPV, there are theoretical methods based on calculus that currently are applied to what are best described as hypothetical assets (because they are far more simple than real assets). Grossman and Stiglitz, among others, use a methodology, usually called the equilibrium approach, although sometimes called state contingent or rational expectation methodology. As an example of a hypothetical asset used by this class of methods, an asset might earn a return of 15 percent when economic conditions are favorable and 4 percent when they are unfavorable. Although it is entirely possible to construct an actual financial asset that would pay its owner such returns, in practice these assets do not exist. These models currently appear to be used only in theoretical articles because they cannot be applied to the types of assets that exist in practice given the existing level of development of the closed form calculus methodology. A September, 1992, article by Longstaff and Schwartz attempts to value extremely simple, yet real, bonds using closed form methods, but is limited to using two input variables, as opposed to this claimed invention, which can utilize an almost unlimited number of input variables using a non closed form method. Pearson and Sun (1994) used closed-form methods to test what is known as the Cox-Ingersoll-Ross model (1985) on actual Treasury bonds. Pearson and Sun reject the model as being unable to explain Treasury prices.

The advantage of equilibrium models is that they do not rely on prior asset or index returns. Economic and asset-specific parameters are specified in such a way that there exists a mathematical solution for the value of the assets. As mentioned, these methods have not been used to value actual assets found in the current market and do not involve risk-return type asset pricing models.

Although there is voluminous academic and applied literature in the prior art, there is limited prior patent art. IBM Technical Disclosure Bulletin (April 1971; literature and foreign patent section; U.S. Class 364, Subclass 408) describes a program to determine the rate of return and the cost of government subsidy for real estate investments. The process also provides an iterative procedure for finding the rent that must be charged to obtain a given rate of return. The iterative process in the IBM bulletin appears to be simply a way to determine what is known as the internal rate of return. It is a process well-known in the prior art since the 1950s. It bears almost no relation to this claimed invention.

U.S. Pat. No. 3,270,170 to Lambert (Aug. 30, 1966) describes an apparatus for evaluating the capital appreciation potential of investments and for predicting future prices of common stock. Lambert discloses (in 1962 before the CAPM's development) a linear model of the relation between stock prices and variables such as: earnings, dividends, asset values, and trading volume. The process apparently uses linear regression of prior stock prices against prior values of the previously-mentioned variables. The resulting regression coefficients are multiplied by predicted values for each of the mentioned variables. The result is a predicted price for common stock. The process does not adjust for risk, does not consider the effect of the mentioned variables on risk, and involves no numerical processes other than simple linear regression and multiplication.

Lambert's process is very different from the present invention because the present invention: (1) does not use coefficients for the types of variables specified in Lambert's invention, (2) does not directly use regression on past values of any variables although regression on prior values may be used indirectly to estimate inputs to this claimed invention; (3) to the extent that the present invention uses predicted values for the types of variables specified in Lambert's invention (e.g., earnings and dividends), it uses them in a discounting process, not in a process whereby they are multiplied by coefficients from regressions on prior values to determine current asset values; and (4) some of the variables used as input to Lambert's process (e.g., prior stock prices and trading volume) need not be used in the present invention application because the models are so dissimilar.

U.S. Pat. No. 4,989,141 to Lyons et al. (Jan. 29, 1991) describes a database process that classifies, stores, and retrieves data that can be used for financial analysis and reporting. Although Lyons et al. could potentially be used as input to the present invention, Lyons et al. does not estimate asset risk or NPV.

U.S. Pat. No. 4,953,085 to Atkins (Aug. 28, 1990) describes a process that selects investments to maximize returns subject to: (1) existing tax laws; (2) investor risk-preferences; and (3) forecasts of economic and financial variables. In particular, the Atkins invention seeks to optimize the allocation of an individual's funds between investments and mortgage payments. The Atkins invention estimates neither asset risk nor asset NPV.

SUMMARY OF THE INVENTION

It is an object of the present invention to provide a method and apparatus to estimate an asset's risk and NPV that, instead of using prior-period returns to estimate risk: (1) estimates an asset's operating, financing and accounting characteristics, (2) estimates general and sector economic relations, and (3) estimates certain current economic conditions, such as interest rates, and to create a portfolio based on the estimated asset risk and NPV.

It is another object of the present invention to provide a method and apparatus for creating a portfolio by: (1) estimating an initial set of cash flows for each asset in a set of two or more assets using known or conventional methods; (2) generate additional estimated cash flows based upon different estimates for one or more economic variables; (3) adjust the original set of cash flows and each additional set of cash flows for expected inflation; (4) determine an initial input risk measure for each asset based on a risk-return type asset pricing model; (5) determine an initial discount rate for each asset using the initial input risk measure for each asset and using different economic variables that relate to each set of cash flows (for example, the risk-free rate and the market risk premium which are typically different for each set of cash flows); (6) discount the inflation-adjusted cash flows at the discount rate to determine a present value for each set of cash flows; (7) use the present values to determine simulated returns for each asset; (8) use the simulated returns for each asset to determine at least one simulated market index return; (9) regress simulated asset returns against simulated market returns or else use division to determine an output risk measure for each asset; (10) use the resulting output risk measure for each asset to estimate a new input risk measure and; (11) repeats steps 1 through 10 (or 4 through 10 in some implementations) in an iterative process until, for each asset, the output risk measure approximates to within desired accuracy the input risk measure used to determine the most recently iterated discount rate.

It is a further object of this invention to provide a method and apparatus to combine the previous iterative process with an iterative process that adjusts the estimated risk premium for a group or class of assets until the estimated total value of those assets approximates their total market value.

It is a further object of this invention to provide a method and apparatus to combine one or more of the previous iterative processes with an iterative process that adjusts the long-run inflation rate until the estimated value of individual assets is close to the actual market prices for those individual assets.

It is a further object of this invention to provide a method and apparatus to estimate the risk premium for one or more assets groups based on the risk premium for a different group of assets.

It is a further object of this invention to provide a method and apparatus to estimate the default premium for debt.

It is a further object of this invention to provide a method and apparatus to estimate the terminal value of an asset.

These and other objects of the invention are accomplished by providing a data processing system that jointly estimates: future cash flows under varying economic conditions; simulated returns; risk; and value for a set of two or more assets. The process of the present invention differs from the prior art, inter alia, in that it may be successfully carried out based upon as few as the following three inputs: (1) estimated economic variables, such as projected interest rates, inflation rates, economy-wide growth rates, and segment growth rates, with an option to include: (a) correlations between economic variables, and (b) specifications as to how those economic variables fluctuate over time; (2) estimated operating, financing, and accounting variables for two or more assets; and (3) a risk-return type asset pricing model or models (such as the CAPM, the APT, or non-linear versions of the CAPM or APT).

A significant advantage of the present invention is that it fully utilizes current information that affects asset risk. In particular, the CAPM is traditionally considered a one factor model but this invention can use many factors in the CAPM without the complexity required by the APT. In addition, because the invention uses forecasted cash flows, it can be used for virtually any asset, including stocks, bonds, real estate, newly formed companies, bankrupt companies, derivative assets (assets derived from other assets), and potential assets, such as assets to be issued in the future. In contrast, with prior art processes the CAPM and APT are rarely used to value assets other than common stocks.

The process begins by estimating an initial set of financial statements and cash flows for each asset (only cash flows if the asset is a bond or similar asset) for some number of periods using estimated operating, financing, accounting and economic variables an analyst has input into the process. Estimated cash flows may be also be adjusted for expected price changes, such as inflation.

The second step is to estimate additional sets of cash flows based upon the initial sets of cash flows. The additional sets of cash flows are determined by using a different estimate for at least one of the economic variables. By way of example, five additional sets of cash flows for each asset may be determined by using five additional sets of estimates for the economic variables. Thus, in this example, there will be a total of six sets of cash flows for each asset (the initial estimate and five additional estimates), where each set of cash flows for an asset may show, for example, estimated quarterly cash flows for the following ten years.

As should be evident, there are several different ways to carry out the second step of the invention. According to one embodiment of the invention, the initial estimates for economic variables, which were used to generate the initial set of cash flows, are revised 5 times as of the date the initial forecast is made (instantaneous changes to the initial and subsequent forecasts) or five times as of some later date, such as 30 days later so as to correspond with the period of the risk-free 30-day Treasury bill. By way of example, suppose that the process is being run as of Feb. 1, 1993, and that an analyst's best estimate is that industrial production will grow by 3% annually (thus, expected industrial growth is one economic variable in this example. It is expected to influence the cash flows of some of the assets, which may be, by way of example, firms producing industrial goods.). The initial growth rate economic variable estimate of 3% may be used to generate an initial set of cash flows for each asset. Next, five revised growth rates, such as, for example, 2.8%, 3.3%, etc., which may be pseudo-randomly generated by a computer using estimated distributions for each economic variable, may be used to generate five additional different sets of cash flows for each asset. Thus, the original growth estimate and the five revised growth estimates are used to generate six sets of estimated cash flows for each of the assets.

The third through sixth steps of the process of the present invention determine a NPV for each of the sets of cash flows for each asset. In the third step cash flows are adjusted for expected inflation. Inflation-adjusted cash flows an investor would receive from each asset (e.g., dividends and terminal value or principal and interest payments) are then discounted by each asset's discount rate. Since, at least initially, the discount rate is unknown, the fourth step is to determine an initial estimate of each asset's risk measure ($\beta$). The fifth step is to determine each asset's discount rate based upon the initial estimate of that asset's risk measure $\beta$, the risk-free rate and the market risk premium. In the sixth step, an NPV is determined for each asset for each of the six sets of estimated cash flows by discounting the inflation-adjusted cash flows from step three by the discount rates from stop five (typically different discount rates for the initial set of cash flows and for each of the five additional sets of cash flows for each of the assets in the portfolio). In subsequent iterations of the process, a new set of discount rates for each of the assets is determined based upon a new and updated risk measure, $\beta$, determined in subsequent steps in this process. The third through sixth steps and the following steps of the process are repeated until the risk measure $\beta$ used in this step to determine the discount rate approximates to desired accuracy the risk measure β determined subsequently in the process.

In the seventh step of the process of the present invention, the NPVs determined from the sixth step are used to determine simulated period-returns for each asset. According to one embodiment of the invention, the first simulated return for each asset is determined by dividing its second NPV by its first NPV and subtracting 1 in order to express the ratio as a return; the second simulated return is determined by dividing its third NPV by its first NPV and subtracting 1 in order to express the ratio as a return, etc. This process is repeated such that, in accordance with the foregoing example, five simulated period-returns are determined for each asset.

In the eighth step of the present invention, the simulated period-returns from the seventh step are used to determine simulated index returns, also sometimes referred to as market returns. For example, the first index return may be determined by dividing the sum of the second NPVs for all assets by the sum of the first NPVs for all assets and subtracting 1 in order to express the ratio as a return. Similarly, the second index return may be determined by dividing the sum of the third NPVs for all assets by the sum of the first NPVs for all assets and subtracting 1 in order to express the resulting ratio as a return. If a version of the APT is used, returns would be determined for a plurality of indexes.

In the ninth step, simulated returns for each asset are regressed against the simulated index returns to estimate a risk measure, commonly referred to as β (or βs with the APT), for each asset. As an alternative to regression, an easier but less theoretically preferred method uses only two simulated returns for each asset and two simulated index returns to determine risk. This is equivalent to using simple division to find the slope of a line through two points. A still easier and less preferred method uses only one return for each asset and one index return. This is equivalent to using division to find the slope of a line that passes through one point and the origin. An indirect alternative is to use the pricing relationships implicit in the efficient frontier, the securities market line or the capital market line.

The tenth step is to revise the risk measure β (the input β) most recently used in step four using the risk measure determined in step nine (the output β). The process repeats steps five through ten (or one through ten in some cases) until there is a very small difference between the input β in step four and the output β from step nine. At this point the system can be considered to be in equilibrium, and the β output in step nine represents the estimated β determined according to the process of the present invention. Assuming that the estimated inflation rates and the estimated returns to the market are correct, the process has determined a value for each asset and the riskiness β for each asset. Accordingly, one may create a portfolio using the value and risk of each asset.

In accordance with alternative embodiments of the invention, the subsequent steps may also:

(1) adjust the market risk premium used to determine the discount rate in step five (which is different than asset risk) until the estimated total market values for one or more assets approximately equals the sum of their actual market values. To estimate the variability of the risk premium, however, it may be necessary to run the process over a 24–36 month initialization period, in a time march. For example, U.S. Treasury securities are among the largest and most active markets in the world. An analyst may believe that, in total, Treasury securities are fairly priced but that some Treasury securities are mis-priced relative to others. This feature of the invention claimed in this application allows an analyst to search for mis-priced securities. A limited test of this invention indicates it is able to help detect underpriced and overpriced assets;

(2) adjust the long-term inflation rate until the sum-of-squares, sum-of-absolute values or other measure of the differences between the estimated value of each asset and the actual market price of each asset is minimized. To estimate the variability of the long-run inflation rate, however, it may be necessary to run the process over a 24–36 month initialization period, in a time march. This feature of the claimed invention permits an analyst to search for undervalued assets without specifying a long-term inflation rate;

(3) equate the risk premium for one or more asset classes, such as U.S. stocks or U.K. Treasury securities (or risk factors in the APT) with the risk premium implied by: the relation between that asset class and the risk premium from an asset class believed to be efficiently priced, such as U.S. Treasury securities. For example, $R_i$ in equation 1 of the background description of this application can be an individual asset or a group of assets. Similarly, $R_m$, can be all assets or a particular group of assets. Simple linear relations can be used to determine the risk premium for one group of assets assuming the risk premium for a different group of assets is correct. For example, an analyst may assume the risk measure for U.S. Treasury securities determined using this invention is correct. By regressing returns for an index of simulated corporate stock returns against the index of simulated U.S. Treasury security returns, it is possible to estimate a corporate stock risk premium. This may be a particular advantage since current methods of comparing the price of corporate stocks with the price of U.S. Treasury securities probably rely more on judgement and on statistics than on formal risk-return analysis;

(4) equate the default risk premium for corporate debt with the default risk premium as implied by the likelihood of default under various economic outcomes;

(5) equate the value of a company's terminal market value to a value implied by its ratio of market value to book value at some earlier date or as implied by various accounting ratios under various economic conditions;

(6) Estimate different βs for each additional set of economic conditions (because risk measures are different under different economic conditions, this may sometimes be desirable). Thus, a different discount rate for each set of economic conditions would be used to determine discounted cash flows under each set of different economic conditions.

BRIEF DESCRIPTION OF THE DRAWINGS

The invention is described in reference to the accompanying drawings in which:

FIG. 1A is a block diagram of the hardware which is used in accordance with the invention;

FIG. 1 is a schematic drawing of the overall iterative process, including how various models and variables are combined to estimate the value of two or more assets;

FIG. 6 is a schematic drawing of the initial iteration of the iterative process as applied to four actual Treasury bonds for August, 1991;

FIG. 7 is a schematic drawing of the iterative process from FIG. 6 where the iterative process has been repeated until the process is in equilibrium (i.e., for each asset, the input beta is approximately equal to the output beta);

FIG. 8 is a schematic drawing of the iterative process from FIG. 7 where the risk premium has been adjusted until the sum of the estimated values of the four bonds is approximately equal to the sum of the market prices of the four bonds;

FIG. 11 is a schematic drawing of how variables are combined to determine a firm's net income; it is an expansion of portions of FIG. 10;

FIG. 12 is a schematic drawing of how variables are combined to determine a firm's balance sheet; it is an expansion of portions of FIG. 10;

FIG. 13 is a schematic drawing of how variables are combined to determine a firm's statement of cash flows; it is an expansion of portions of FIG. 10; and FIG. 14 is a schematic drawing of how information from FIGS. 11–13 is used to estimate cash flows for an investor and the net present value of those cash flows; it is an expansion of portions of FIG. 10.

TABLE OF ABBRIVATIONS

Figure 2:
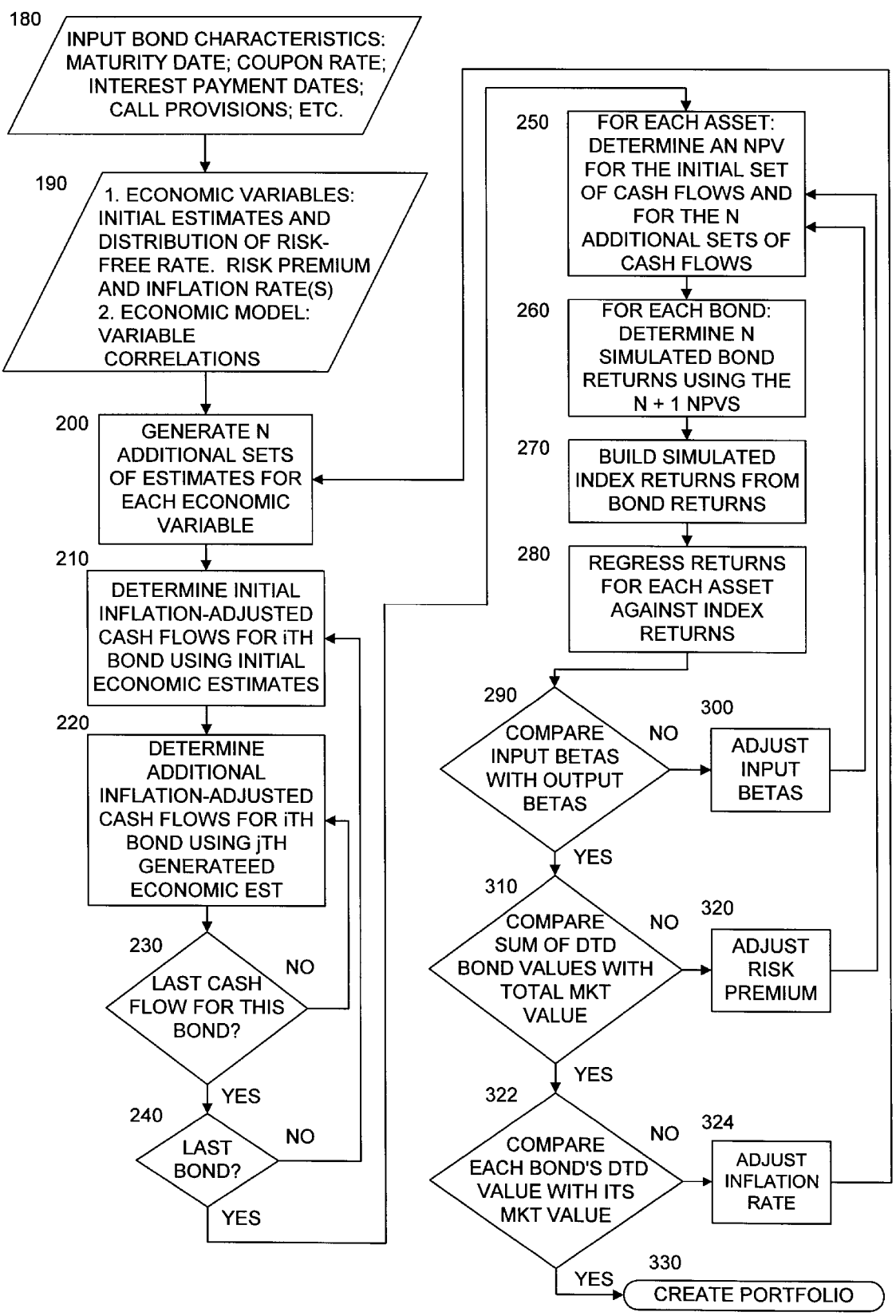
FIG. 2 is a schematic drawing in greater detail of how the iterative process is used to estimate the value of bonds.

In the drawings the following abbreviations are used:
Abs=Absolute
Abs diff=Absolute difference
Bal=Balance
Bid-ask mid=Midpoint of the bid (offering) price and the ask (selling) price
Co=Company
Co betas=Company betas
Cum=Cumulative
Cum infl=Cumulative inflation
Cur=Current
Diff=Difference
Disc=Discount
Dtd=Determined
Econ=Economic
Econ vars=Economic variables
Est=Estimated or Estimate
Est infl=Estimated inflation
Ests=Estimates
Infl=inflation
Intl=Initial
Mat=Maturity
Mid=Midpoint
Mkt=Market
Mo=Month
NPV=Net present value
NPVs=Net present values
Oper=Operating
Oper sgmt=Operating segment
Param=Parameters
Rel=Relative
RF=free rate
RF/infl=Risk-free rate adjusted for inflation
Rprem=Risk premium
Sgmt=Segment or Segments
Vars=Variables

DETAILED DESCRIPTION OF THE PREFERRED EMBODIMENTS

The data processing system for carrying out the invention comprises means for entering estimates of economic variables that are expected to affect inflation-adjusted future cash flown of one or more assets, means for entering estimates of operating, finance, and accounting variables for two or more assets, a processing unit for computing estimated financial statements, estimated cash flows, and inflation-adjusted cash flows for two or more assets (only cash flows or inflation adjusted cash flows if the assets are bonds) using the initial estimates of economic variables and asset-specific variables, and a processing unit for computing the NPV of each of said two or more assets, given a discount rate for each asset as implied by a preferred asset pricing model. In an iterative or recursive numerical process, an initial estimate of the discount rate is selected.

Said data processing unit also contains means for selecting different estimates of said economic variables. Said different estimates may be selected randomly or non-randomly and may be based on estimated behavior of said economic variables. The data processing unit means for computing estimated future financial statements, cash flows, and NPVs are then applied to each of the different estimates of economic variables to produce one or more additional said NPVs for each said asset. Said NPVs, which include all cash flows to or from owners of said assets, are used to estimate simulated returns for one or more periods for each said asset. Said data processing unit also contains means for computing an index or indexes of returns for each economic variable or set of economic variables comprising at least one asset affected by said economic variable or set of economic variables.

Said data processing unit contains means for computing a risk measure or measures for each asset using a preferred risk-return type asset pricing model and said simulated asset and index returns. The data processing unit also contains means for reducing to an acceptably small number the difference between the discount rate initially used to discount estimated cash flows and the discount rate implied by the estimated risk measure or measures for each asset. Said data processing unit can also contain means to reduce to acceptably small numbers the differences between several other variables, including: (1) the estimated risk premium or premiums for a group of one or more assets and the risk premium implied by assuming the total market value of the group of assets is correct; (2) the estimated risk premiums for a group of assets and the risk premium implied by assuming the risk premium for a different group of assets is correct; (3) the estimated long-term inflation rate that minimizes the sum-of-squares, sum-of-absolute values, or other measure of the differences between estimates of the value of individual assets and the actual market prices of those assets; (4) the estimated default-risk premium used to determine an asset's value and the risk premium implied by one or more variables determined in the iterative process; and (5) the estimated ratio of market value to book value used to determine an asset's terminal value and the ratio implied by the iterative process.

With the foregoing overview in mind, the process and system of the present invention will now be described in greater detail and in conjunction with FIGS. 1–14.

The invention is preferably implemented using a digital processor such as a programmable digital computer system 1 shown in FIG. 1A. The computer system 1 comprises a central processing unit (CPU) 2, (which may be replaced by a plurality of CPUs, preferably configured for parallel processing), a read only memory (ROM) 3, and a random access memory (RAM) 4, an I/O port 5, an input device 6, an output device such as a display 7, data storage device 8 and a modem 9. The CPU 2 includes an arithmetic and logic unit (ALU), registers, a program counter, instruction registers and the like as is well known to those skilled in the art. Conventional data and address busses interconnect the CPU with the ROM 3 and RAM 4 and I/O port 5. Input device 6, such as a keyboard 6a, is connected to the I/O port 5 for providing electrical input data signals to the CPU 2 representative of input parameters as explained further below. It is understood that the input device may additionally or alternately comprise a voice actuated input device 6b generating electrical signals corresponding to a user's voice for both command sequences and data input, or may alternately or additionally comprise a mouse 6c used in conjunction with display 7 to select appropriate input data. Other devices may of course be used to provide part of all of the data input such as data from a data storage device 8 (hard drive or floppy, tape, magnetic and/or optical disk, flash memory, etc.) used alone or in conjunction with the keyboard 6a and/or display 7 and mouse 6c. Some input data may be obtained directly from a live price feed from, for example, the New York Stock Exchange via a direct phone line, a satellite link, or other communications methods.

The I/O port provides queries to the user typically through an output device in the form of a display 7 such as a video monitor, liquid crystal display or the like. A voice synthesizer could additionally or alternately be used as an output device. A printer may also be used as an output device especially when a hard copy of the output data is desired. Further, output data may be stored on the data storage medium 8 and/or sent via a modem 9 (or similar network interface such as Ethernet, Fiber Distributed Data Interface (FDDI), Integrated Services Digital Network (ISDN) known to those of skill in the art) to remote locations. Typically, the modem may be used to place buy and sell orders so as to create a portfolio in accordance with the risk measures as taught herein. Of course, buy and sell orders may also be placed over the telephone by calling a stock broker.

In carrying out an embodiment of the invention, a computer program is stored in ROM 3 and/or RAM 4 and is executed in accordance with certain mathematical and non-mathematical algorithms. The program is designed to halt at various times after prompting the user for input of certain data. After the user provides the requested data, generally followed by a command signal resulting from depressing, for example, the "enter" key on the keyboard 6, the computer continues to execute program instructions utilizing the data input by the user. The programmed computer is interactive with the user and transforms certain input data signals, generated, for example, by keystrokes on the keyboard 6, into different electrical signals during execution of the program, and finally providing output electrical signals corresponding to the output risk measure as determined in the computer. These output risk measures are provided on the output device such as display 7. From these output risk measures, a portfolio is created by buying and/or selling assets. Stocks, bonds or other assets having a higher market price than the present value may be sold and those with a lower market price than the determined price may be purchased. Similarly, a portfolio with unacceptable risk, as measured by the risk measures determined by the process described herein, may be adjusted to an appropriate risk level by purchasing additional stocks, bonds or other assets that are not presently part of the portfolio or by selling some of those that are part of the portfolio. In addition, incentive compensation payments may be made to managers or employees of a company or to sellers of a company or asset based on the determined present value.

In carrying out the program, computer system 1 sets up and utilizes certain data files which may physically reside in the RAM 4 and/or the data storage device 8.

The steps set forth below in relation to the flow charts of FIGS. 1–5 and 9–10 may be implemented into a computer program loaded into the RAM 4 of computer system 1. Computer system 1 may comprise a programmable digital computer such as any of the many types of personal computers readily available on the market. It is contemplated that the application program used in carrying out the invention would require a computer having at least 8 megabytes of RAM storage capacity, and would most optimally operate in a window-type environment. As a non-limiting example, the computer may be an IBM PS/2 model 77 computer containing a 486 family central processor with a hard disk drive storage capacity of about 30 megabytes. The exemplary data shown in FIGS. 6–8 were obtained using QuatroPro, a commercially available spreadsheet program.

Referring first to FIG. 1, there is illustrated an overview of the process of the present invention. In Step 10, one or more asset-specific variables, such as a bond's coupon rate and principal, or a company's current sales, are entered into the computer system 1 via input device 6. According to a preferred embodiment of the invention, the particular asset-specific variables are determined by reference to one of several predetermined asset models 20. Thus the asset models 20, which may be comprised of look-up tables for the data elements or other data structures (meaning herein physical relationships among the stored data elements) stored in RAM 4 and/or data storage device 8. These data structures together with associated program instructions, specify and/or prompt the user to input information required in Step 10. The computer instructions interactively prompt the user for asset specific data and receive electronic signals indicative thereof followed by at least one command signal, e.g., generated from, for example, the "enter" key on the keyboard. Economic information, such as the risk-free rate and the current rate of inflation, is entered in the same interactive manner in Step 30. According to a preferred embodiment of the invention, the particular economic information input in Step 30 is specified with reference to one of several predetermined economic models 40 which may be comprised of look-up tables or similar physical data structures. In Step 50, several sets of cash flows are determined for a specified number of periods, such as each of the next twenty quarters, for each asset under various economic conditions. The cash flows determined in Step 50 are preferably determined with reference to one of several predetermined asset cash flow models 60. The asset cash flow models 60 may specify how cash flows are to be determined, such as quarterly or semi-annually, as well as how to determine the last cash flow (terminal value) if the asset has value beyond the last period for which cash flows are determined.

With respect to choosing inflation rates, there are many possibilities. Currently, the preferred method is to use a 4–6 month average of the CPI as the inflation rate for one month. One then divides 1.0+the 30-day Treasury yield by 1.0 plus the one-month inflation rate to determine the risk-free rate. Next one determines the cumulative inflation rate as of one year from the valuation date by dividing 1.0 plus the 1-year Treasury yield by 1.0 plus the computed risk-free rate. One then assumes that the inflation rate changes uniformly, on a daily basis, from the 30-day rate to the one-year rate. Thus, for example, the one-year cumulative inflation rate might be 5.6% but the rate as of one year might be 5.9%, which is the level needed to increase the cumulative inflation rate from its level as of one month to its cumulative level of 5.6% as of one year. That is done through an iterative or convergent process. One can next use an anchor year that the user can specify, such as two or three years. One can then increase the inflation rate uniformly on a daily basis from its level as of one year (5.9% in this example) to the long-term inflation rate as of the anchor year. Thus, if the anchor year is 3, and the long-term inflation rate is 8.0%, the inflation rate increase increases uniformly, on a daily basis from 5.9% to 8.0%. As is obvious to one skilled in the art, users of said process may prefer other methods of estimating inflation rates.

In Step 70 net present values (NPVs) for each of the assets are determined, preferably by reference to one of several predetermined discounting models in Step 80. The discounting models in Step 80 specify if and how cash flows are to be adjusted for inflation, the risk-return type asset pricing model to be used for discounting, and how the discount rate is determined from the risk-return type asset pricing model and from economic variables including an initial estimate of the risk measure for each asset. In Step 90 simulated returns for each of the assets are determined using net present values from Step 70. The simulated returns are preferably determined according to one of several predetermined simulated return models 100. In Step 110 a risk measure $\beta$ is determined for each asset using the simulated returns from Step 90 in accordance with one of several predetermined risk-return models 120.

Step 130 tests whether the difference between each asset's input risk measure used to discount projected cash flows in Step 70 and that asset's output risk measure determined in Step 110 is within a predetermined acceptable range. If, in Step 130, the difference between the input risk measure and the output risk measure is greater than a predetermined amount for any asset, a new, adjusted input risk measure $\beta$ is determined in Step 140 for each such asset and the process returns back to Step 70 (or to Step 50 in some implementations where cash flows depend on the risk measure). However, unlike the iterative process for asset risk measures and for the risk premium, this difference cannot be reduced to an arbitrarily small amount, only to a minimum value that depends upon various input parameters and market prices for individual assets. Typically, but not in all cases, selecting a new $\beta$ that is between the input $\beta$ and the output $\beta$ will assure that the process will converge, as desired. If the difference between the input and output risk measures is less than a predetermined limit for each asset, Step 130 passes control to Step 150. Step 150, which is an optional, yet preferred step to the basic process, tests whether the difference between the sum of one or more estimated asset values in Step 70, and the sum of the actual market prices of those assets, is within a predetermined limit. If, in Step 150, the difference is greater than the predetermined limit, the process continues to Step 160 where a new market risk premium $(E(\tilde{R}_m)-R_f)$ is determined. For example, if the total actual market value of the assets is greater than the total market value determined by the process, then the estimated risk premium should be increased. After the risk premiums are adjusted in Step 160, the process returns back to Step 70. When the difference between the total actual market value of the assets and the total values determined by the process are within a predetermined limit, the process continues from Step 150 to Step 162.

In Step 162, the value of each of the bonds is compared to its respective market price (it is possible to use assets other than bonds in this step, but because of their known cash flows, bonds or other fixed income instruments are probably preferable to other assets). If the value of any particular bond, or a subset of all the bonds, significantly differs from the market value, this is an indication that the long term inflation estimates used by the process were likely inaccurate. Thus, in Step 162 if a measure of the difference between the value of each of the bonds and their market value (such as the sum of squares of individual differences) is greater than a predetermined amount, the process continues to Step 164 where the long term inflation rates used by the process are adjusted and the process loops back to Step 70. If in Step 162 the measure of the difference between the value of each of the bonds and their market value is less than a predetermined amount, the process continues at Step 170 where the risk measure determined by the process may be printed or otherwise displayed to the user, with other useful information including asset prices, estimated inflation, estimated risk premiums, estimated standard deviations for each bond (which may be useful for evaluating options) and, if desired, over and under valued assets. In Step 172, the portfolio may be created (using the modem or telephone to buy/sell assets) based on the various outputs of Step 170. Thus, bonds in a portfolio determined to be over priced might be sold and those not in the portfolio that were determined to be underpriced might be purchased. Similarly, if the risk measure of a portfolio was deemed to be unacceptably high, such as a portfolio having a $\beta$ of 2.0 when a $\beta$ of 1.5 was the desired risk level, certain bonds in the portfolio with $\beta$s above 1.5 might be sold and certain bonds not in the portfolio with $\beta$s below 1.5 might be purchased. Thus, the portfolio can be modified or created based on some target risk measure. Because the relationship is linear, $\beta$s are additive. Thus, if one buys $10,000 of a bond with a $\beta$ of 1.0 and $10,000 of a bond with a $\beta$ of 2.0, the portfolio $\beta$ is 1.5.

As will now be described with reference to FIG. 2, the process of the present invention may be implemented to determine the risk measure and value for a plurality of bonds which essentially define the market used in the analysis.

Preferably, many bonds will be included with a relatively wide range of maturities and coupon rates in order to provide a broad and meaningful sample. In addition, such diversity will ensure that the effect of one mis-priced bond is minor and will not significantly distort the overall results of the process.

Referring now to FIG. 2, an embodiment of the process of the present invention is illustrated which estimates the risk measure and value of a plurality of bonds. Beginning with Step 180, information relating to the particular characteristics of the bonds which may be useful to estimate a bond's projected cash flows is entered into the computer system 1. Such information may include, for example, the maturity date of the bond, the coupon rate, the interest payment dates and the call provisions. In the relatively simple case of a U.S. Treasury bond, for example, in Step 180, a user will input: (1) the coupon rate (used to determine semi-annual interest payments, and which may be zero for a zero-coupon bond), (2) the maturity date (used to determine how long the bonds will pay interest), and (3) the principal amount (which may be zero for an interest-only bond). In the case of a callable bond, call provisions may also be specified in Step 180 by entering the first call date, subsequent call dates and call prices.

In Step 190 estimates are entered into computer system 1 for an initial set of economic variables relating to the bonds input in Step 180. For example, the risk-free rate may be entered as 3.0% annually, with an expected standard deviation over a 30-day period of 0.4%. In an alternative embodiment of the invention, standard econometric methods may be used to define a relatively complex model of how the risk-free rate or inflation or any other economic variable is expected to fluctuate over time. For example, the risk-free rate may be expected to fluctuate or vary somewhat randomly over time, but more significant changes over time may be dependent on another variable, such as inflation. Such a model may be defined as the distribution of each economic variable, or alternatively, in combination with a relationship between one or more of the economic variables used in the process. With respect to some variables, such as the risk premium and the long-term inflation rate, which can be determined by said iterative process, it may be necessary to estimate variability by running said entire iterative process over a 24–36 month initialization period, in a time march.

In Step 200, n additional sets of estimates are generated for each of the economic variables input in Step 190. Thus, after Step 200 is completed, n+1 sets of estimates for the economic variables will have been generated. These additional sets of estimates may be determined in relation to the initial economic estimates input in Step 190. For example, if the risk-free rate entered in Step 190 is 3.0% annually, Step 200 might pseudo-randomly generate different rates of 3.3%, 3.5%, etc. based on the distribution of the risk-free rate entered in Step 190 and also based on the correlations entered in Step 190. Additional economic estimates may be generated: (1) as of the current date, such that different estimates could be expected immediately; (2) as of 30 days from the current date, such that different estimates could be expected to coincide with the 30-day T-bill rate, which is often considered the risk-free rate, or (3) as of some later date.

In Step 210 an initial set of cash flows is generated, beginning with the first bond, usually for the life of the bond. Those projected cash flows are then adjusted for the inflation as input in Step 190 (which, as discussed, may include a short-term inflation rate, a long-term inflation rate, and an anchor year, which defines the transition time between the sort-term and long-term inflation rates). The process then continues to Step 220, where an additional set of inflation-adjusted cash flows for the first bond using the first additional set of economic variables is generated in Step 200. In Step 230, the process continues looping back to Step 220 until n additional sets of inflation-adjusted cash flows for the first bond have been generated relating to the n additional sets of economic variable estimates input in Step 200. Thus, when the process continues for the first time from Step 230 to Step 240, n+1 inflation-adjusted cash flows will have been determined relating to the first bond. A similar process of generating an initial and n additional sets of inflation-adjusted cash flows for each of the remaining bonds is performed by control looping from Step 240 to Step 210 after n+1 cash flows have been generated for the first bond. Thus, the second time the process continues to Step 240, n+1 inflation-adjusted cash flows will have been generated for the second bond. When n+1 inflation-adjusted cash flows have been generated for each of the bonds, the process continues from Step 240 to Step 250.

In Step 250, the initial economic variables input in Step 190 are combined with a risk return type asset pricing model and an initial estimate of each bond's risk measure ($\beta$) to determine a discount rate for each bond. For example, the initial risk-free rate may be added to the product of the initial estimate of the market risk premium of Step 190 and the initial estimate of the bond's risk measure $\beta$. For each bond, each of the n+1 sets of inflation-adjusted cash flows are discounted at that bond's discount rate to produce n+1 NPVs for each of the i bonds.

In Step 260 NPVs determined from Step 250 are used to determine a set of simulated returns for each of the bonds. For example, the first simulated return for the first bond may be determined by dividing the NPV from the first generated set of inflation-adjusted cash flows by the NPV from the initial set of inflation-adjusted cash flows and subtracting 1 to express the ratio as a return. The second simulated return for the first bond may be determined by dividing the NPV from the second generated set of inflation-adjusted cash flows by the NPV from the initial set of inflation-adjusted cash flown and subtracting 1 to express the ratio as a return. It should be evident that there are other suitable techniques for determining simulated returns from the NPVA. For example, as an alternative technique, the second simulated return for the first bond may be determined by dividing the NPV from the second generated set of inflation-adjusted cash flows by the NPV from the first generated set of inflation-adjusted cash flows and subtracting 1 to express the ratio as a return. In practice the results of these two different techniques have been nearly identical.

In Step 270 simulated index returns are determined using the simulated bond returns determined in Step 260. There are well-known methods of constructing a value-weighted index, including summing the NPVs of individual bonds for the first generated set of inflation-adjusted cash flows, summing the NPVs of individual bonds for the initial set of inflation-adjusted cash flows, and then dividing the first sum by the second sum and subtracting 1 to express the ratio as a return.

In Step 280 the simulated returns for each bond and the simulated index returns are used to determine a risk measure ($\beta$) for each bond. In a preferred embodiment of the invention, the original Sharpe-Lintner asset pricing model will be used together with the statistical technique of linear regression in order to determine the risk measure associated with each bond. According to another embodiment, the Sharpe-Lintner model may be implemented using only two simulated returns for each bond, or only one simulated return for each bond based upon the assumption that the origin is a second point, i.e., a 0.0% excess return for an asset and 0.0% excess return for the index (0.0% in excess of Rf). In either of these simplified methods simple division can replace linear regression as a technique to determine a bond's risk measure.

Step 290 compares the input risk measure used in Step 250 with the output risk measure determined in Step 280 with a pre-determined limit. If the difference between the input and output risk measure exceeds the predetermined limit, in Step 300 a new risk measure is determined such that in the next iteration of Steps 250 through 280 it is likely that the difference between this new input risk measure, and the next output risk measure determined in Step 280, will be reduced. For example, if a bond's input risk measure is 0.8 and its output risk measure is 0.9, Step 300 might choose a new input risk measure of 0.85. Choosing a new input risk measure closer to the output risk measure will generally cause the input and output risk measures to converge more rapidly, but in some cases if the new input beta is too close to the output beta the two numbers may diverge. Further, in some situations it may be necessary to choose a new input risk measure outside of the range 0.8 to 0.9. According to a preferred embodiment of the invention, Step 290 will include a technique to determine whether the input and output betas are converging or diverging. As should be evident, the process may provide the user with the option of choosing a process that is likely to converge rapidly but that may diverge, or a process that is likely to converge slowly but that is unlikely to diverge. Once the difference between input and output risk measures is below the pre-determined limit for each bond, Step 290 passes control to Step 310.

Steps 310 and 322 represent optional, yet preferred steps in the process of the present invention. In Step 310, the sum of estimated values for one or more bonds is compared with the sum of the market prices of those bonds. If the difference between the sum of the estimated bond values and the sum of the market prices exceeds the predetermined limit, in step 310 a new market risk premium is determined such that in the next iteration of steps 250 through 300 it is likely that the difference between the new sum of the estimated bond values and their market prices, as determined in step 310, is likely to be reduced. If the difference is less than a predetermined limit, the process continues to Step 322. In Step 322 the value of each bond, as determined by the process, is compared to the market value of each bond. If the sum-of-absolute value or other measure of the difference between the determined value and the market value of each bond is not at its minimum value within a predetermined amount, this is an indication that the long term inflation rate estimate used by the process was different than the long term inflation rate implied by the market and the process continues to Step 324 to adjust the long term inflation rate. After the long term inflation rate is adjusted in Step 324, the process loops back to Step 250 to determine anew the risk measure β and value of each of the bonds, and to 320 which adjusts the market risk premium so that it is likely that the previous difference will be reduced after the next iteration of Steps 250 through 300. When the difference is less than the pre-determined limit, Step 322 passes control to Step 330, where the portfolio is implemented (purchases or sales) in accordance with the risk means determined. After completion of the process in Step 330, a risk measure and value for each of the bonds has been determined by the process of the invention and a portfolio created accordingly. It should be noted that while steps 310 and 322 are preferred steps in building the present invention, they are best implemented as optional steps, since some users may prefer other alternatives.

Figure 3:
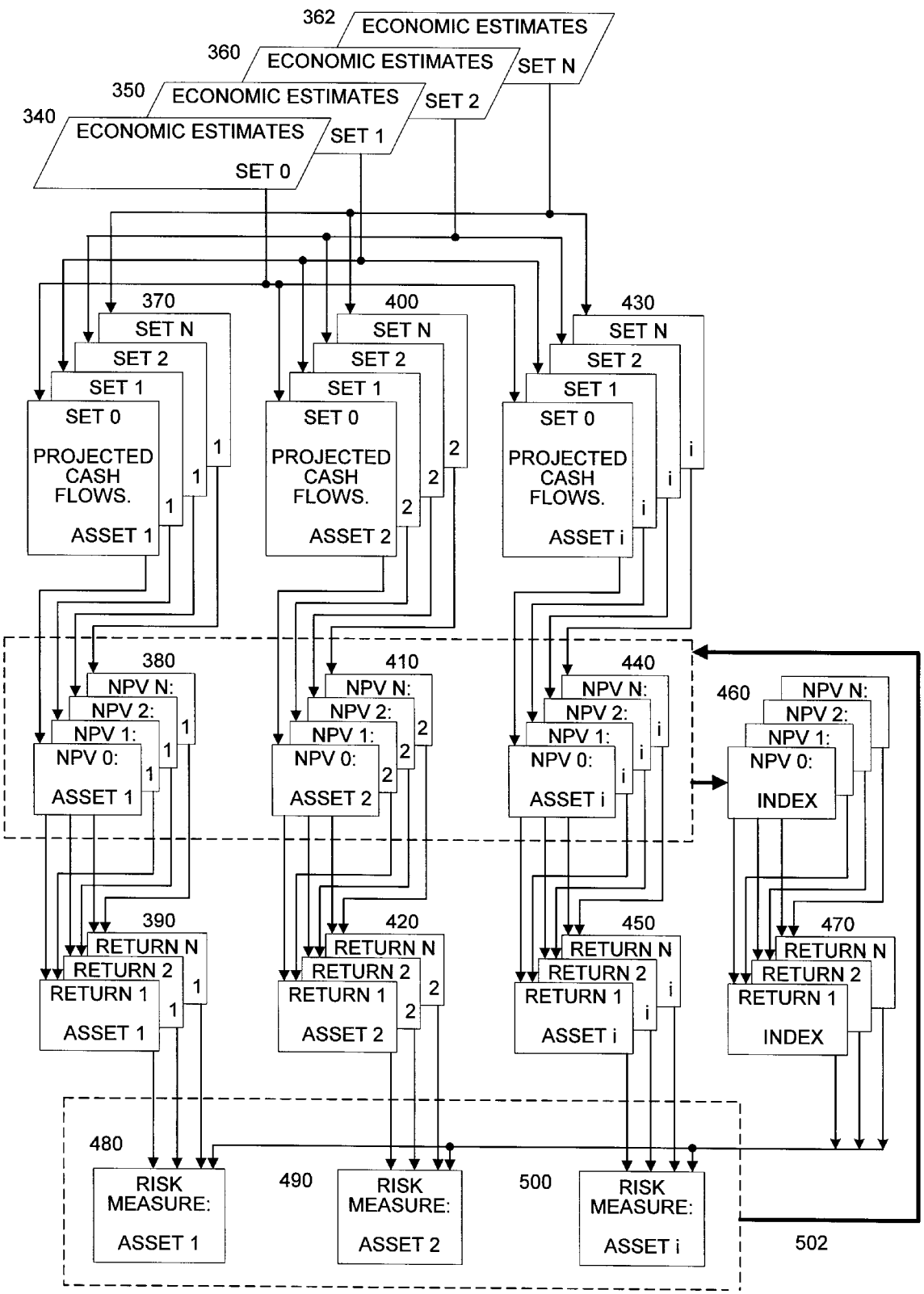
FIG. 3 is a schematic drawing of how different estimates for economic variables are used to estimate projected cash flows for each asset, how those cash flows are used to determine NPVs for each asset and for an index, how NPVs are used to determine simulated returns, how simulated returns are used to determine output risk measures, and how the iterative process is used to re-estimate NPVs and asset values.

Referring to FIG. 3, the general flow of information according to the process of the present invention is illustrated. Block 340 represents an initial set of estimates for economic variables that are input into computer system 1 by a user of the process. As can be seen, there are 0 through n (hereinafter 0–n) different sets of estimates of economic variables. As should be evident, Blocks 340, 350, 360, and 362 would likely be implemented as a three dimensional matrix with one dimension corresponding to the number of periods for the estimates, a second dimension corresponding to the number of different economic variables and the third dimension corresponding to the number of sets n of different estimates of the economic variables. For example, Block 340 may contain information such as an estimated inflation rate over the next year of 2.1%, and an estimated 30-day U.S. Treasury bill rate of 3.0%. In Block 350 an additional set of economic variables is stored which may have been generated possibly randomly within a specified range by using, for example, a set of distributions and correlations input by a user. Block 350 may contain a different estimate for the inflation rate of 2.3%, and an estimate for the 30-day U.S. Treasury bill rate of 3.3%. Similarly, Block 362 contains information relating to the last and nth additional set of economic variables that will be used by the process.

Block 370 represents the set of projected cash flows for the first asset. As can be seen, for each of the i assets, one set of cash flows is determined for each set of economic variables. In the illustrated case, for the first asset, ASSET 1, there are 0–n projected cash flows. Thus, given n+1 sets of economic variables, there will be generated n+1 sets of cash flows for each asset. As should be evident, Blocks 370, 400 and 430 may be readily implemented as a three dimensional matrix with one dimension corresponding to the number of periods for which cash flows are estimated, a second dimension corresponding to the number of sets n of different estimates of the economic variables and a third dimension corresponding to the number i of different assets. Some of the cells of the matrix may, of course, not be used in the process because of the differing maturities of the bonds. As illustrated, the economic variable estimates from Block 340 (SET 0) are used to determine the initial set of projected cash flows (SET 0) for each asset. As shown with respect to Block 370, 0–n projected cash flows are determined for ASSET 1 which correspond, respectively, to the 0–n estimates of the economic variables. For example, if asset 1 is a bond, the initial annual inflation rate of 2.1% in Block 340 would be used to compute set 0 of the inflation-adjusted cash flows which would be stored as SET 0 in Block 370. As can be seen, each set of cash flows for each asset represents essentially a stream or list of estimates, whereby one estimate is provided for each set of economic estimates. Likewise, estimates for another set of economic variables from SET 1 is used to determine the second set of projected cash flows (SET 1) for each of the assets. The second set of projected cash flows for ASSET 1 would also be stored in Block 370. For example, if ASSET 1 were a bond, an estimated inflation rate of 2.3% from Block 350, would be used to inflation adjust the principal value and interest payments in SET 1 of ASSET 1 in order to generate SET 1 of inflation-adjusted cash flows stored in Block 370. Similarly, the nth estimated economic variable information from Block 362 is used to determine cash flows for the nth set of cash flows for each of the assets.

In Block 380 cash flows from Block 370, corresponding to ASSET 1, are discounted at the discount rate implied by:

(a) economic variables under each set of economic conditions, (b) the selected risk-return type asset pricing model, and (c) the input risk measure for that asset. For example, one economic variable used in the Sharpe-Lintner asset pricing model is the risk free rate (30-day Treasury bill rate). Thus, the 30-day rate of 3.0% from Block 340, and SET 0 of the projected cash flows corresponding to ASSET 1 from Block 370, are used to determine NPV 0 for ASSET 1 in Block 380. The 30-day rate of 3.3% from Block 350 and SET 1 of the projected cash flows corresponding to ASSET 1 from Block 370 are used to determine NPV 1 in Block 380.

As should be evident, Blocks 380, 410 and 440 (including possibly Block 460 as well) may be implemented as a two-dimensional matrix with one dimension corresponding to the number of assets and the second dimension corresponding to the number of different estimates of economic variables. Thus, the three dimensional matrix formed from Blocks 370, 400 and 430 is transformed into a two dimensional matrix in Blocks 380, 410 and 440 whereby the dimension corresponding to the number of periods for which inflation-adjusted cash flows are estimated has essentially been "collapsed" to a single value in order to give the not present value for an asset given a particular set of estimates of economic variables.

The 0–n NPVs from Block 380 are used to determine 1–n simulated returns which are stored in Block 390. As illustrated in Block 390, RETURN 1 for ASSET 1 is determined by dividing NPV 1 from Block 380 by NPV 0 from Step 380 and subtracting 1. The last return, RETURN n, is determined by dividing NPV n in Block 380 by NPV 0 in Block 380 and subtracting 1. The other returns corresponding to ASSET 1 are determined in a similar manner and stored in Block 390. According to an alternative embodiment of the invention, the returns may be determined differently, such that RETURN n in Block 390 could be determined by dividing NPV n in Block 380 by NPV n−1, in Block 380 and subtracting 1. Similar to Blocks 380, 410 and 440, Blocks 390, 420 and 450 may be implemented as a two-dimensional matrix with one dimension corresponding to the number of assets and the second dimension corresponding to the number of additional estimates of economic variables (total sets of economic estimates minus one).

The type of information stored in Blocks 400 through 420 is similar to that stored in Blocks 370 through 390. Blocks 400 through 420, however, contain information relating to the second asset, ASSET 2. Similarly, the type of information stored in Blocks 430 through 450 is similar to that stored in Blocks 370 through 390, but Blocks 430 through 450 relate to information for the last asset, ASSET i.

In Block 460 there is stored an index NPV 0 which is determined by adding the NPV 0 for each of the assets 1 through i in Blocks 380, and 410 through 440. Similarly, in Block 460 there is stored an index NPV for each set of NPV's used in the process. For example, in Block 460 there is stored index NPV 1 which is determined by adding the NPV 1 of each of the assets 1 through i; in Block 460 there is also stored index NPV n which is determined by adding NPV n for each of the assets 1 through i.

In Block 470 there are stored index returns determined using the index NPVs stored in Block 460. For example, index return 1 is determined by dividing NPV 1 from Block 460 by NPV 0 of Block 460 and subtracting 1. Index return n, which is also stored in Block 470, is determined by dividing index NPV n of Block 460 by index NPV 0 of Block 460 and subtracting 1 or, alternatively, by dividing index NPV n by index NPV n−1 and subtracting 1.

In Block 480 there is stored a risk measure for ASSET 1 that is determined by regressing the n simulated asset returns of Block 390 against the n simulated index returns of Block 470. Similarly, in Block 490 there is stored the risk measure for ASSET 2 which is similarly determined by regressing the index returns of Block 420 against the n index returns of Block 470, and in Block 500 there is stored the risk measure for ASSET i which is determined by regressing the returns from Block 450, corresponding to ASSET i, against the index returns of Block 470.

As should be evident, Blocks 480, 490 and 500 may be implemented as a one dimensional matrix, or a list of a length i corresponding to the number of assets used in the process. Each element of the list corresponds to the risk measure $\beta$, i.e., the output risk measure, which has been determined by the process for each of the i assets.

The output risk measures $\beta$ for ASSET 1 through ASSET i which are determined as part of the process of the present invention are stored respectively in Blocks 480 through 500 and are used to determine new input risk measures $\beta$ which will be used to determine new NPVs for each of the assets which will then be stored back in Blocks 380, 410, and 440, and a new set of index NPVs to be stored in Block 460. That is, the output risk measure $\beta$ stored in Block 480 is used to determine a new input risk measure $\beta$ for use to determine a new set of NPVs for ASSET 1 which will be stored in Block 380. Typically, the output risk measure $\beta$ stored in Block 480 will be combined with the previous risk measure $\beta$ (used to determine the previous set of NPVs of Block 380), so that the process may determine a revised NPV 0, and NPV 1 through NPV n for ASSET 1. Similarly, the output risk measure $\beta$ for ASSET 2 in Block 490 is used, in combination with the previous risk measure $\beta$ for ASSET 2, to determine a revised NPV 0, and NPV 1 through NPV n for ASSET 2 which will be stored in Block 410; the output risk measure $\beta$ from Block 500 is used, in combination with the previous risk measure $\beta$ for ASSET i, to determine a revised NPV 0, and NPV 1 through NPV n for ASSET i which will be stored in Block 440.

Each time the process loops back, the information stored in Blocks 380 through 500 is revised and updated using the i new risk measures determined based on the previous i input risk measures used in Blocks 380 through 440 and the i output risk measures determined in Blocks 480 through 500. The process continues determining revised values for information stored in various memory blocks until: (1) the output risk measure from Block 480 approximates the input risk measure most recently used in Block 380 to determine NPV 0, NPV 1, and NPV n for asset 1; (2) the output risk measure from Block 490 approximates the input risk measure most recently used in Block 410 to determine NPV 0, NPV 1, and NPV n for asset 2; and (3) the output risk measure from Block 500 approximates the input risk measure most recently used in Block 440 to determine NPV 0, NPV 1, and NPV n for asset i.

Figure 4:
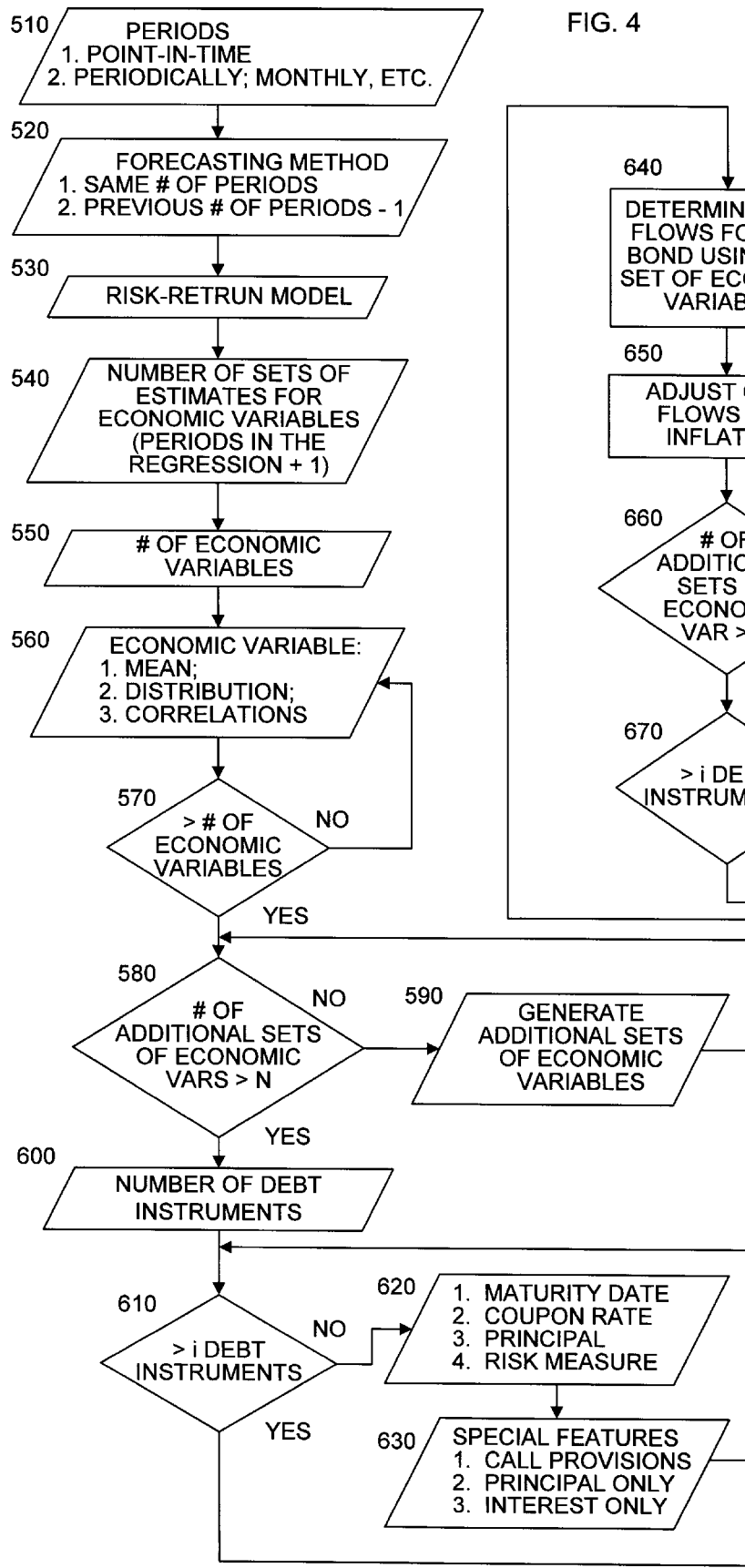
FIG. 4 is a schematic drawing illustrating how information is input into the claimed invention to determine discounted cash flows for bonds.

Referring now to FIG. 4, the process of the present invention is described with respect to an implementation for bonds in greater detail than in FIG. 2, based on the flow of information described in FIG. 3. In Step 510 a starting date for the process is input as well as a set of parameters which dictate how selected sets of economic variables are to be used by the process. In FIGS. 1–5 and in subsequent FIGS. 6–8, revised sets of economic variables are assumed to have been determined at a point in time (both the initial set of cash flows, and the five revised sets of cash flows, were all valued as of Aug. 31, 1991). In contrast, the revised cash flows would have been valued as of a later date. For example, assume that the initial set of cash flows is determined as of a particular date, such as May 15, 1993. Additional revised sets of cash flows are determined as of Jun. 15, 1993, or one month later, so as to correspond with the 30-day period of risk-free Treasury bills.

As an alternative, Step 510 permits an analyst to determine revised sets of cash flows periodically or intermittently. For example the first revised set of economic variables, and associated set of cash flows and simulated returns, may be made as of one month (or one quarter) later, and a second revised set of economic variables and associated set of cash flows and simulated returns an additional month (or quarter) later. Typically, periods will be uniform, such as weekly, monthly, or quarterly. Analysts may differ on which method is superior, so the preferred embodiment of this claimed invention allows a choice of methods.

In the case of periodic simulated returns, Step 520 permits an analyst to use the same number of projected cash flows (such as twenty quarters) for each set of projected cash flows or fewer projected cash flows for the revised sets of cash flows. For example, if the asset is a company, and projected cash flows are revised quarterly, the first set of cash flows can be made for twenty quarters, while the second set of cash flows can be made for nineteen quarters, in which case both sets of cash flows end on the same date. Alternatively, the second set of projected cash flows can also be made for twenty quarters, in which case the second set of cash flows will extend one calendar quarter later than the first set of projected cash flows. As in the case of Step 510, the preferred embodiment allows an analyst to choose the method in Step 520 because analysts may express a preference for one method or the other. However, the preferred embodiment is probably point-in-time.

In Step 530 an analyst selects a risk-return type asset pricing model. Preferably this Step will allow a user to select one of a plurality of predetermined asset pricing models, such as the original Sharpe-Lintner asset pricing model, Ross' APT model, or a non-linear version of either of those models. Although such models may be implemented using a variety of conventional techniques, the selection in Step 530 will essentially involve selection of one of several sets of rules corresponding to the available asset pricing models. The selection may be made by selecting one of several models as prompted by computer system 1.

In Step 540 the user specifies (via entering data into computer system 1) the total number of sets of estimated economic variables to be used in the process of the invention. The minimum number of sets is two so that there may be at least one return determined for each asset. Preferably, however, a considerably larger number of sets of economic variables will be selected, which will likely provide better results from the process.

In Step 550 the user specifies the number and type of economic variables to be used. By way of example, in the case of bonds the process may be carried out using the risk-free rate and a market risk premium. It is preferable to include inflation as one of the economic variables used by the process. As will be described in greater detail later, in the case where the invention is implemented with respect to firms (to estimate the cash flows, simulated returns and risks of stocks) a far greater number of economic variables should be included. In Step 560 the user enters into computer system 1 the current estimate for each economic variable (i.e., the mean), the statistical distribution (assuming that the revised sets of economic variables are to be randomly generated using statistical methods), and any correlations between variables. The preferred embodiment permits a user to specify a wide range of correlations between variables, including non-linear relations and relations where variables are jointly dependent (the expected inflation rate in one month may partially depend on the current risk-free rate while the expected risk-free rate in one month may partially depend on the current inflation rate). As an additional feature, Step 550 permits a user to specify how inflation is expected to change over time. For example, a user may estimate that the inflation rate will be 2.1% annually for the next six quarters, gradually increase to 3.7% from quarters seven through 12, and thereafter remain constant at 3.7%.

In Step 570, the process loops back to Step 560 until information has been entered for all economic variables. After information for each of the economic variables is entered in Step 560, the process continues from Step 570 to Step 580 where the process tests to determine if additional economic variable information has been generated for each of the economic variables used in the process. Step 590 generates additional sets of economic variables, such as a revised risk free rate and a revised inflation rate, using the information input in Step 560. Once the required number of sets of revised economic conditions have been generated Step 580 passes control to Step 600.

In Step 600 the user enters the number of debt instruments, or bonds, to be evaluated. In Step 610, the process determines whether characteristics for each of the bonds has been input in Step 620 and 630. Thus, the process loops between Steps 610, 620 and 630 until the characteristics of each bond are determined in an interactive fashion with the user by, for example, the input device 6 and display 7. In Step 620 information for each of the specific bonds is entered, such as the maturity date, coupon rate, principal and an initial risk measure for each bond which has been estimated by the user. For example, initially a risk measure of 1.0 may be used for each bond. Alternately, an initial risk measure for each bond may be determined based upon a predetermined set of rules that a user may develop.

Although the process of the invention may be successfully carried out with a wide range of initial risk measures input in Step 620, for computational efficiency it is preferred that the user choose risk measures that are close to the expected risk measure for that bond. Some extreme initial risk measures (such as −20 for some bonds and +20 for others) may require that the process include elaborate and sophisticated routines to ensure that the process converges to an equilibrium condition (where input betas equal output betas).

In Step 630 an analyst enters additional information for each bond. Although a basic version of the process of the invention may be implemented using simple U.S. Treasury bonds with no special provisions, a preferred embodiment will allow special provisions for certain bonds, such as call or put features. Although such additional features can be extremely complex, they may be handled by the invention by using conventional techniques, such as well-known option pricing methods.

Once characteristic information has been entered for all of the bonds to be used in the process, Step 610 passes control to Step 640. During the first pass of the process through Step 640, the projected cash flows for the first bond using the initial set of economic conditions are determined. In the case of a Treasury bond the economic conditions have no effect on non inflation adjusted cash flows but for certain bonds, and for companies, economic conditions do influence projected cash flows. In Step 650 the projected cash flows from Step 640 are adjusted for inflation using the inflation rate(s)

from the original set of economic conditions. After the initial pass of the process through Steps 640 and 650, the process loops back from Step 660 to Step 640 where additional cash flows for the first bond are determined using the additional sets of economic information. The process continues to loop between Steps 640, 650 and 660 until one set of inflation-adjusted cash flows has been determined for the initial set of economic estimates and for each additional set of economic estimates. Next, in Step 670 the process loops back to Step 640 where the next bond is selected and, in Steps 640, 650 and 660, inflation adjusted cash flows for each set of economic estimates are determined for that bond. The process continues to loop from Step 670 to Step 640 until a full set of inflation adjusted cash flows is determined for each of the bonds used in the process.

Figure 5:
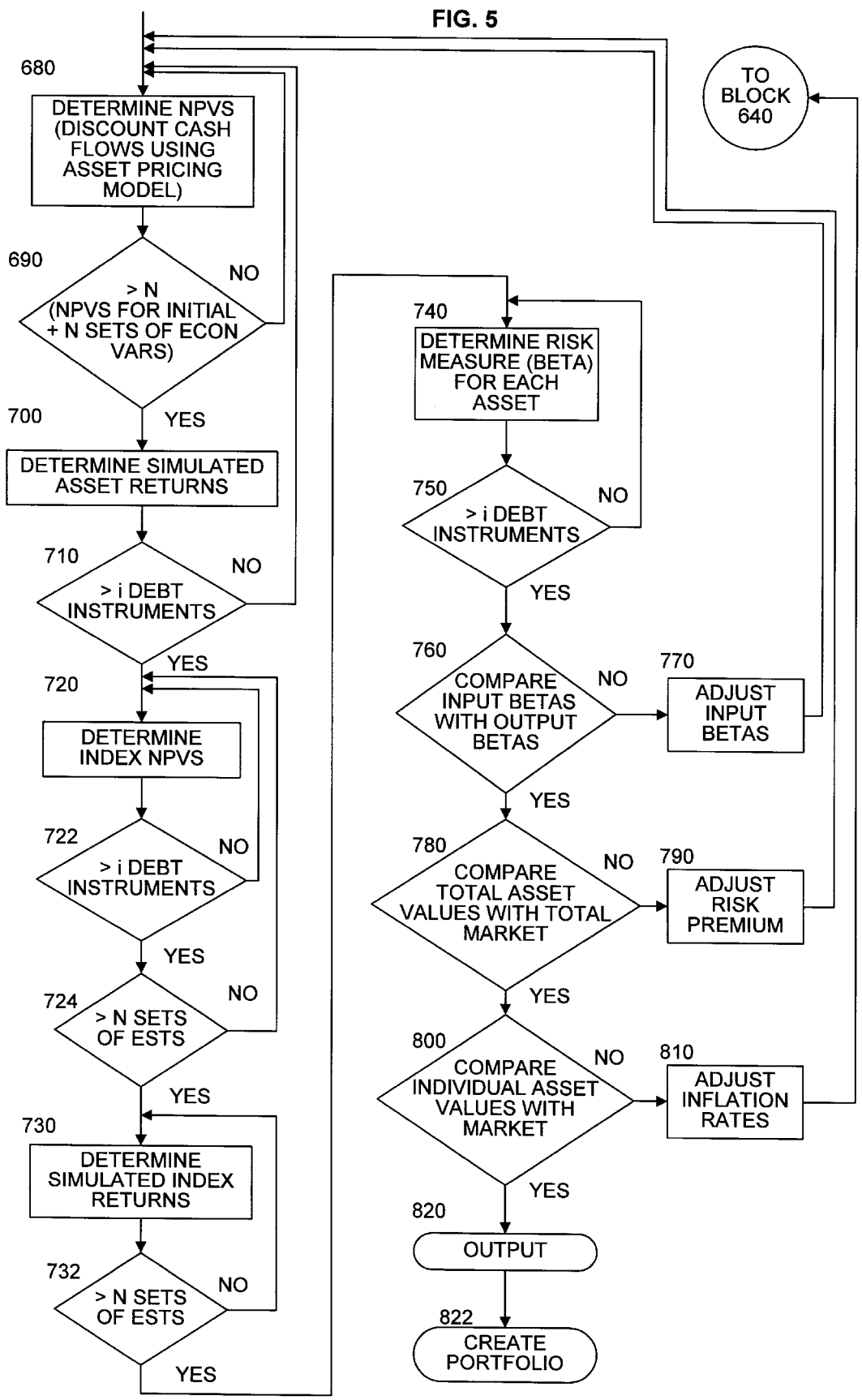
FIG. 5 is a schematic drawing that begins at the finish of FIG. 4 and that illustrates the iterative process for bonds.

Referring now to FIG. 5, in Step 680 the inflation-adjusted cash flows determined in Step 650 are discounted for the bond's market-adjusted risk to give the net present value (NPV) by using conventional rules and techniques associated with the risk-return model selected in Step 530. During the initial pass of the process through Stop 680, one set of NPV's is determined for the first bond using the risk-free rate and an initial estimate of the market risk premium from Step 560, and the initial risk measure for the first bond as input in Step 620. In Step 690, the process loops back to Step 680 to determine another NPV for the first bond corresponding to the next set of inflation adjusted cash flows for the first bond and another risk-free rate and market risk premium generated from Step 590 and the same risk measure from Step 620. The process continues to loop from Step 690 to Step 680 until an NPV is determined for each of the inflation adjusted cash flows of the first bond. Once NPVs have been determined for each set of economic variables for the first bond, the process continues from Step 690 to Step 700, where simulated returns are determined for the first bond using the NPVs corresponding to the first bond as determined in Step 680.

Although simulated returns may be determined in a number of different ways, according to one embodiment of the invention simulated returns for each bond will be determined with respect to the first NPV of each bond. Considering the first bond, by way of example, the first simulated return will be determined as the return represented by the ratio of the second NPV for the first bond with respect to the first NPV for the first bond minus 1. Similarly, the second simulated return for the first bond will be determined as the return represented by the ratio of the third NPV for the first bond with respect to the first NPV for the first bond minus 1. Thus, when all the returns have been determined, there will be one fewer simulated return for each bond than NPV for each bond. As should be evident, this is only one of several ways in which simulated returns may be determined from the set of NPVs for each bond. (However, in any iteration, the same method of determining simulated returns should be used for each asset and for the index). In many applications, this approach may be preferred since the first NPV for each bond essentially represents the value of that bond under the user's best estimate of the economic conditions, and the subsequent NPVs for each bond represent the value of that bond under different economic conditions. Likewise, the simulated returns for each bond represent the difference in performance for that bond under the differing economic conditions represented by the different sets of economic variable estimates.

Next, in Step 710 the process loops back to Step 680 to similarly determine a set of NPVs and simulated returns for the next bond. The process continues to loop from Step 710 to Step 680, each time determining NPVs and simulated returns for the next bond, until NPVs and simulated returns have been determined for all of the bonds used in the process.

In Step 720, a set of index NPVs is determined for each group of economic variable estimates used in the process. The index NPVs essentially represent the total market value of the bonds used in the process as determined with respect to one of the sets of estimates of economic variables. Thus, an index NPV is the sum of the NPVs for each bond for a particular group of economic variable estimates. As can be seen, the process loops from step 722 to step 720 until the initial index NPV has been summed over all bonds. The process then passes control from step 722 to step 724, where another NPV is determined with respect to a different set of economic conditions. As can be seen, the process loops from Step 722 back to Step 720, each time determining a new index NPV for each set of economic variable estimates. After all the index NPVs have been determined, the process continues to loop between Step 732 and Step 730 in order to determine simulated index returns from the index NPVs, preferably using the same technique used to determine the returns for each of the bonds. After index NPVs and index returns are determined for each set of economic variable estimates in Steps 720 and 730, the process continues to Step 740.

In its first pass through Step 740, an output risk measure is determined for the first bond. Preferably, the output risk measure will be determined by regressing the simulated returns for the first bond (as previously determined in Step 700) against the simulated index returns (as previously determined in Step 730). As should be evident, techniques other than regression could be used to determined a risk measure for a bond. For example, if there are only one or two simulated returns for each asset, an output risk measure could be determined using simple division. Similarly, β could be determined indirectly by using the well-known relationships of the efficient frontier, the securities market line or the capital market line. After an output risk measure is determined for the first asset in Step 740 the process loops back from Step 750 to Step 740 to determine an output risk measure for the next bond. The process continues to loop from Step 750 to Step 740 until an output risk measure is determined for each bond; then the process continues from Step 750 to Step 760.

Next, in Step 760, the risk measures for each bond which were input in Step 620, i.e., the input betas, are compared to the corresponding risk measures for each bond which have been determined in Step 740, i.e., the output betas. If the difference between the input beta and the output beta for any individual bond exceeds a predetermined limit, or if the sum of all absolute differences exceeds a predetermined limit, the process continues from Step 760 to Step 770. In Step 770 the input risk measures which were used in Step 680 are adjusted such that it is likely that each newly determined input risk measure is likely to be closer to the next iteration's output beta from Step 740. Thus, the input risk measures are adjusted in a manner that will allow the input risk measures and the output risk measures to converge. After the input risk measures are adjusted in Step 770, the process loops back to Step 680 where new NPVs, simulated returns and output risk measures are determined based upon the new, adjusted input risk measures. The process continues looping from Step 770 to Step 680 until, for each bond, the difference between the input and output risk measures is less than the predetermined limits, then the process continues from Step 760 to Step 780.

When Step 760 is completed, the process has determined a risk measure for each of the bonds used in the process. For certain embodiments the process could end with the risk measures determined in Step 760 and the subsequent portfolio creation. However, according to a preferred embodiment of the invention, the process will continue with the few remaining steps illustrated in order to improve the accuracy of the risk measures that have been determined and to improve the accuracy of estimated asset values. One such preferred additional step is illustrated as Step 780, the sum of the bond values as determined using the risk measures determined by the process is compared to the sum of the bond values as found in the actual market place. If the difference between those amounts is greater than a predetermined amount, it may be assumed that the initial estimates for the market risk premium were incorrect, and the process continues to Step 790 where the initial risk premium estimate from Step 560 is adjusted and the process loops back to Step 680 in order to determine another set of risk measures based upon the new estimate of the risk premium.

Another potential preferred step in the process is illustrated in Step 800 where individual estimated bond NPVs which were determined in Step 680 are compared with actual market prices for those bonds. This feature allows the user to estimate how the market is currently estimating long-run inflation (or, equivalently, to estimate the long-run inflation rate implied in the prices of individual bonds). Step 800 may be carried out by first computing the sum-of-absolute values of the individual differences between estimated bond values and actual bond market prices, or the sum-of-squares of those differences (hereinafter sum-of-squares) or other measure of the individual differences. If the sum-of-absolute values of the differences or the sum-of-squares of those differences does not represent a minimum value, the process continues to Step 810 where the estimate for long-term inflation rates used by the process is adjusted such that the sum-of-squares of the individual differences is likely to be reduced and the process loops back to Step 640 where new risk measures are determined based upon the new long-term inflation rates. According to a preferred embodiment of the invention, Step 800 of the process is repeated in a convergent fashion until a minimum value of the sum-of-squares is determined, to within a predetermined amount. In this regard, Step 800 contrasts with Steps 760 and 780, where the differences can be, for practical purposes, reduced to zero. When the minimum sum-of-squares or other measure is determined in Step 800, the determined risk measure and other results of the computation are provided to the output device in Step 820. In step, 822, the portfolio is created in accordance with the output data. In practice, it may be possible to combine the two separate loops shown at Step 790 and 810 such that the market risk premium and the long term inflation rate are each adjusted during each iteration of the single outer loop.

Given the risk measures for each of the bonds determined by the process as well as the long-term inflation rate which has been determined, a user may use this information or some combination of this information in order to determine whether a particular bond is over- or under-priced and to build a portfolio accordingly. The risk measure for each bond may be of great interest in hedging risk, while the variances of simulated returns and the estimated bond values may be of great use in pricing bond options or other derivative instruments. The estimate of the long-term inflation rate may also be of great use in pricing numerous other financial instruments, including foreign exchange.

Referring now to FIG. 6, there is illustrated by way of example partial numerical results for the process of the invention as applied to four actual bonds for August 1991. Although the illustrated example almost certainly contains fewer bonds than a user would likely include, it provides a rather useful detailed illustration of the process of the invention.

Block 830 illustrates values for various economic variables to be used by the process. Illustrated in the left portion of Block 830 are a set of initial economic conditions, including the annual risk free rate of 5%, an initial estimate for the semi-annual risk premium of 1.3%, and the then-current annual inflation rate of 3.1%. The fourth line in Block 830 shows that the 3.1% annual rate of inflation will remain constant for two years; a 3.1% annual rate of inflation translates to a 1.53817% semi-annual rate of inflation, as shown in period 0, column 2, of the right portion of Block 830. The fifth and sixth line of the left portion of Block 830 indicate that the six-month rate of inflation will decline gradually by 0.2% by the end of year 5 (to a rate of 1.338% as shown in line 10 of the first column of Block 900). As should be evident, the process may be implemented in a variety of ways in order for the user to specify the economic variables of interest. The user may be prompted to enter the inflation rate at each period, or alternatively and as illustrated, the user may be prompted to enter information relating to the initial inflation rate and information relating to changes in the inflation rate such that the system will generate values for the inflation rate at each period.

The right portion of Block 830 shows the initial economic conditions (row 0) and five revised economic conditions (rows 1–5). Typically, the first estimate (row 0) will represent the user's best estimate of the current economic conditions. In this simple example, the initial estimate of inflation is all that changes between the various revised economic conditions. As shown, the estimate for the initial inflation rate increases by 0.5% for the first revision, and by an additional 0.5% for revision 2, and then declines to 1.83817%, 1.23817%, and 1.03817% for the subsequent revised initial inflation rate estimates. The risk-free rate shown in the third column of Block 830 is the semi-annual risk-free rate after adjusting for the semi-annual rate of inflation in the second column of Block 830. As shown in this simple example, the semi annual inflation adjusted risk free rate of 0.0091723 (the square root of 1.05/1.031, minus 1) remains constant over the five additional sets of economic conditions (alternatively, the non-inflation adjusted risk-free rate has moved in proportion to changes in estimated inflation). The initial risk premium for each of the revised estimates is shown in the fourth column of Block 830 and also remains constant over the five revised sets of economic conditions. According to a more complex alternative embodiment of the invention, a user might specify that the 6-month inflation rate, the risk free rate, and the risk premium fluctuate randomly based on specified distributions and correlations.

Block 840 illustrates the variables relating to the characteristics of the bonds used in the process, which for this example are four $100,000 U.S. Treasury bonds. The example uses bonds with maturities of two years, three years, six years and ten years. As illustrated in the first column of Block 840, the two-year bond has a maturity of August 1993 and a coupon rate of 0.08625% with a bid-ask mid (the mid-point of the quoted bid/offering price and the quoted ask/selling price) of 104.08, i.e., 104 and 8/32, or $104,250. Since the two-year bond has a $100,000 face value and a 0.08625% coupon rate, the two-year bond will pay $4,312.50 semi annually. Similar information relating to the three-, six- and ten-year bonds in illustrated in columns two, three and four, respectively of Block 840.

For each of the bonds used in the example, the user has specified an initial input beta of 1, as shown in the first row of Block 850. The last row, row four, of Block 850 shows the discount rate for each bond, which is determined using the Sharpe-Lintner model as the sum of (1) the risk-free rate and (2) each bond's input beta multiplied by the risk premium. During the first iteration of the process as shown in Block 850, the discount rate of 0.0221723 is determined by adding (1) the risk-free rate of 0.91723% as shown in column three of the right portion of Block 830 and (2) each bond's input beta of 1 multiplied by the risk premium of 1.3% as shown in column four of the right portion of Block 830.

Using the economic information as illustrated in Blocks 830, 840 and 850, inflation adjusted cash flows are determined, by six-month periods, for each of the bonds as illustrated in Block 890. Since each of the bonds is of a different maturity, the number of periods for which cash flow values have been determined differs for each bond. For example, as illustrated in Block 890 there are 4 six-month periods associated with the cash flows for the two-year bond and there are 20 six-month periods associated with the cash flows for the ten-year bond. Illustrated in Block 900 is the estimated and cumulative inflation for each of the six-month periods. As previously described, during the first two years (first four 6-month periods) the estimated semi-annual inflation rate is 1.538%. After the first five years (first ten 6-month periods) the semi-annual inflation rate drops to 1.338%. From semi-annual periods 5 through 9 the rate gradually decreases as shown in Block 900.

The right-most column of Block 900 shows cumulative inflation by period. For example, the 3.1% cumulative inflation for period 2 equals 1.01538 from row 1 of the left-column (estimated inflation) multiplied by 1.01538 from row 2 of the left-column, minus one. The 4.686% cumulative inflation rate in row 3 equals 1.031 from the right-column of row 2 (3.100%+1) multiplied by 1.01538 from row 3 (1.538%+1, minus one.

The inflation-adjusted cash flows in Block 890 are determined by first determining the actual cash flow by period. For the two-year bond the unadjusted cash flow in each of the first three periods is $4,312.50 (i.e., one-half of 8.625% of $100,000), while in the fourth period it is $104,312.50, or the $100,000 of principal plus the $4,312.50 of interest. In order to determine inflation adjusted cash flows, the unadjusted cash flows are divided by one plus the cumulative inflation rate, as shown in the right-most column of Block 900. For example, with respect to the first bond, in period 1 the $4,247.2 inflation-adjusted cash flow is determined by dividing the actual $4,312.50 interest payment by 1.01538. Similarly, the $4,119.5 inflation-adjusted cash flow of the third period is determined by dividing the $4,312.50 payment by 1.04686. That process is repeated for each period in which a bond will have cash flows. Row 0 of Block 860 shows the NPVs of the cash flows from Block 840 for each of the four bonds. For example, NPV 0 for the two year bond of 101,907.88 is determined by discounting the inflation-adjusted cash flows from Block 890, and summing them, as follows: (1) 4247.2/1.0221723, plus (2) 4148.8/1.02217732, plus (3) 4119.5/1.02217233, plus 98133.9/1.02217234 equals 101,907.88. (Note: the computations in FIGS. 6-8 were performed using a commercial spreadsheet package. Any apparent rounding errors may result from numbers shown in the figures that contain fewer digits than are used in the computations).

The cash flows and inflation estimates illustrated in Blocks 890 and 900 correspond to the first set of economic information from Block 830, namely, an initial inflation rate of 1.538%, a risk free rate of 0.917% and a risk premium of 0.013 (from the first row of estimates in Block 830). Inflation adjusted cash flows for each of the bonds is similarly determined using the five additional sets of economic variable information set forth in rows 1–5 of Block 830. Although the inflation-adjusted cash flows for those sets of economic conditions are not shown, the NPV's corresponding to those inflation-adjusted cash flows are shown in rows 1–5 of Block 860. The NPV's for each of the bonds at each of the estimated economic conditions is determined by discounting the inflation-adjusted cash flows by the applicable discount rate, as illustrated in the last row of Block 850. Using the initial and five additional sets of economic conditions, an initial and five additional inflation-adjusted cash flows and NPV's are determined for each of the bonds. In addition, a set of index NPV's is determined for each set of the economic conditions and is illustrated in the last column of Block 860. As can be seen, for each set of the economic conditions, the index NPV's merely represent the sum of the NPV's for each of the bonds at that particular economic condition.

Block 870 illustrates the simulated returns, which are determined based upon the NPV's as illustrated in Block 860. For example, the first return for the two-year bond, i.e., −1.83%, as set forth in the first row of Block 870, is determined by dividing NPV 1 for the two-year bond ($100,042.93) by NPV 0 for the two-year bond ($101,907.88) and subtracting one. That process is repeated for each of the sets of economic conditions for each bond, thereby providing a total of five simulated returns for each bond. In practice the number of simulated returns would likely be greater than five, and may depend on the asset being evaluated, but this small number serves to illustrate the invention claimed in this application. The last column of Block 870 illustrates simulated index returns which have been determined in a similar manner based upon the index NPVs set forth in the last column of Block 860.

Next the simulated bond returns from Block 870 are regressed against the simulated index returns from the last column in Block 870 in order to determine a beta for each of the bonds used in the process. The betas determined in this manner are set forth in the second row of Block 850. In addition, the third row of Block 850 illustrates the difference between the value of the betas which has just been determined by linear regression, i.e., the OUTPUT betas, and the value of the betas used to determine the discount rate for the process, i.e., the INPUT betas. As can be seen in the third row of Block 850, the relative difference between the input and output betas is, in each case, relatively large, indicating that the process is not yet in equilibrium. That is, the input beta used to determine the discount rate, which in turn is used to determine NPVs, is significantly different from the output betas determined by regressing simulated bond returns against simulated index returns. As will be explained in greater detail, a new input beta will be determined (usually between the former input beta and output beta) and the process will be repeated such that another output beta will be determined by the process, which is repeated. The difference between the new input and output betas will again be examined to determine if the process is in equilibrium.

In addition to considering the difference between input and output betas, according to a preferred embodiment of the invention, the process will consider a number of other factors in order to determine if the process is yielding meaningful results. In particular, the first row of Block 880 shows the actual market value of each bond, i.e., the bid-ask midpoint from Block 840, converted from 32nds to tenths, and multiplied by 1,000. The second row of Block 880 shows the difference between the bid-ask midpoint and the discounted estimated value of each bond, as shown in row 0 of Block 860. The right-most number in the second row of Step 880 shows that aggregate sum of the differences across all bonds is $2,934.49. The third row of Block 880 sets forth the corresponding absolute value of those differences. The additional factors determined in Block 880 do not need to be considered further in this first iteration of the process since the difference between the input and output betas indicates that the process was not yet in equilibrium. Those factors will, however, be considered in subsequent iterations when the difference between the input and output betas is relatively small, indicating that the process is in equilibrium.

As mentioned in the summary of the invention, there are many alternate ways to build and use the claimed invention. One alternative method involves what is essentially an inner loop. Note that the only change in economic or asset-specific variables from FIG. 7 to FIG. 8 is that the risk premium changed, causing a change in betas for each of the four bonds to change (e.g., from 0.4677781 to 0.4599471 for the two-year bond).

In the processes previously described, the final beta computed for each bond was used to compute the next discount rate for cash flows associated with the initial set of economic conditions as well as for cash flows associated with each of the additional five sets of economic conditions. As an alternative, it is possible to use the described process to compute a different beta for cash flows associated with each alternate set of economic conditions (wherein it would be necessary to consider each alternate set of economic conditions to temporarily be the initial set of conditions, and to generate additional alternate sets of economic conditions for each of the original alternate sets of economic conditions. This inner loop would likely increase the accuracy of the process. Obviously, this inner loop could be repeated as an additional inner loop, but it is unlikely that the validity of the process would improve by much other than for the first inner loop, as applied to the original five alternate sets of economic conditions).

Referring now to FIG. 7, there is similarly illustrated partial results of the process of the invention relating to a subsequent iteration. For this iteration new input betas, as illustrated in the first row of Block 930, have been selected that lie between the previous input beta and the previous output beta. Based upon these new input betas, another iteration of the process is performed. This subsequent iteration illustrated in FIG. 7 is identical to the initial iteration as illustrated in FIG. 6 except that different input betas have been selected, which, in turn, have resulted in different output betas, determined NPVs (Block 940), and simulated returns (Block 950). As shown in Block 930, at this iteration of the process, the input betas are approximately equal to the output betas, indicating that the process is now at equilibrium. The right-most number in the second row of Block 960, however, indicates that the new sum of the differences between the market prices of the bonds and their values as determined by the process has risen to $12,309.81. This is an indication that the value of the market risk premium is likely in error, and that the user should select a new market risk premium that reduces this difference to a relatively small number.

Referring now to FIG. 8, there is illustrated yet another iteration of the process of the invention where the risk premium has been adjusted to a value such that the difference between the sum of the market prices of the bonds and their determined values is only $8.55, as shown in the right-most column of the second row of Step 1050. Although the betas used in this iteration have changed due to the adjustment in the risk premium, the difference between the input and output betas is still relatively small, indicating that the process is in equilibrium.

Figure 9:
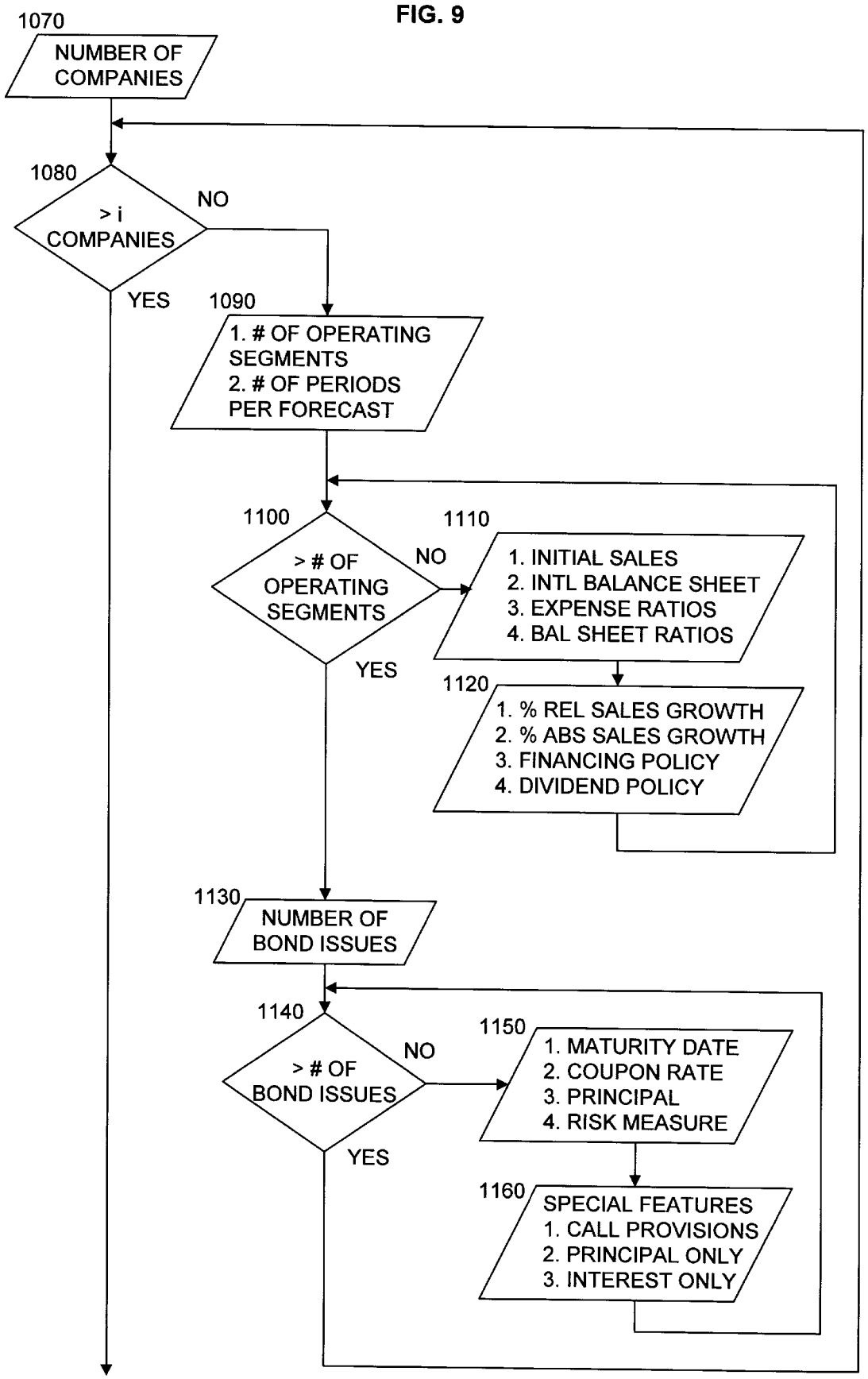
FIG. 9 is a schematic drawing of a portion of the iterative process applied to two or more companies. It is similar to portions of FIG. 4, a schematic drawing that applies to bonds.

Referring now to FIG. 9, there is illustrated a flow diagram representation of the process of the invention when implemented with respect to companies. The same flow diagram is also applicable with respect to stocks or other equity asset, since the value of the stock of a company is basically the value of the company. Since this flow diagram corresponds in substantial part to the flow diagram illustrated in FIG. 4 with respect to bonds, only the portions of FIG. 9 that differ significantly from FIG. 4 will be described in detail. Steps 1070 through 1160 in FIG. 9, correspond to and could be considered the company equivalent of Steps 600 to 630 of FIG. 4. In Step 1070 a user enters the number of companies to be considered in the process. If information has not been entered for all companies, Step 1080 passes control to Step 1090. In Step 1090 a user enters the number of operating segments for a company and the number of periods per forecast. In a preferred embodiment of the invention, the process is implemented with a wide range of flexibility, so that a user may choose to enter information for several sectors for a company or may choose to aggregate all sectors into one. A user may choose to project cash flows for the same number of periods for each company or may use a different number of periods for different companies or for different segments of one company.

In Step 1100, control is passed to Step 1110 where basic information about one segment of a company is entered, including the initial sales, initial balance sheet numbers, and expected expense and balance sheet ratios. In Step 1120 additional information is entered relating to that segment, which may include and is not limited to: (1) the percentage of sales growth relative to the expected market (or industry growth), such as 0.8 times the percentage growth in gross domestic production; (2) the percentage of absolute growth in sales, such as 1%, irrespective of the growth in gross domestic production, possibly combined with a distribution on the percentage absolute growth in sales; (3) information on financing policy, such as maintaining a ratio of current assets to current liabilities of at least 1.4, and maintaining a ratio of long-term debt to equity of no more than 0.8, and; (4) dividend policy, such as a constant dividend until earnings increase or decrease beyond some base rate by at least some percent. Thus, according to a preferred embodiment of the invention Steps 1110 and 1120 permit a user to use existing methods of forecasting cash flows for a company in as much or as little detail as desired.

When information from all operating segments of a company has been entered, Step 1100 passes control to Step 1130, where a user enters the number of different bond issues or other debt instruments for that company. Next, in Step 1140 the process continues to Step 1150, where bond information is entered, as was described with respect to Step 620 of FIG. 4. Similarly, in Step 1160 information on a particular bond issue is entered, as was described with respect to Step 630 of FIG. 4. The process continues to loop between Steps 1140, 1150 and 1160 until information is entered for each bond issued by the company. Step 1140 then passes control to Step 1080, which repeats Steps 1090 through 1160 until information has been entered for each segment and each bond for every company. (A similar set of steps can be used for other financial instruments, such as options, using well-known methods). Step 1080 then passes control to Step 1170.

Figure 10:
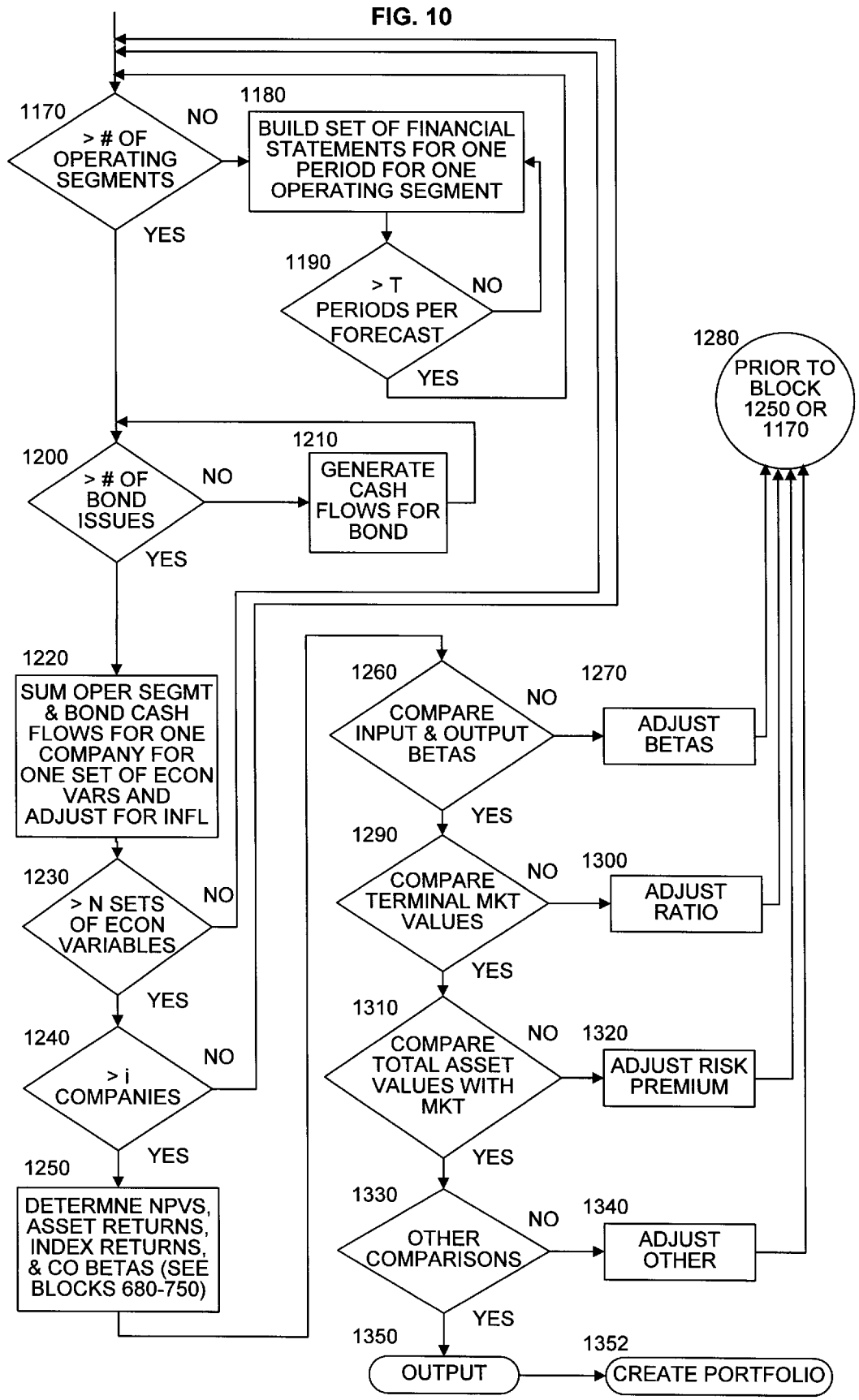
FIG. 10 is a schematic drawing of another portion of the iterative process applied to two or more companies; it is similar to portions of FIG. 4 and to all of FIG. 5, which are schematic drawings that apply to bonds.

Referring now to FIG. 10, the process illustrated in FIG. 9 is continued. The portion of the process of the invention which is shown in FIG. 10 corresponds substantially to the portion of the process illustrated as Steps 640 through 820 of FIGS. 4 and 5. In particular, Steps 1170 through 1210 are used to determine unadjusted cash flows, in a manner similar to the determination of unadjusted cash flows in Step 640 of FIG. 4. As should be evident, it is considerably more complex, however, to determine cash flows for companies than for bonds. For example, in Step 640 of FIG. 4 pertaining to bonds, the cash flow for a particular period for a particular bond is usually the principal multiplied by one-half the coupon rate of interest. In contrast, Step 1170 passes control to Step 1180, where a complete set of financial statements is constructed for one operating segment of a company to determine the estimated cash flow for that operating segment for one period.

The process continues to loop between Step 1180 and Step 1190 until cash flows have been estimated for the required number of periods. For example, if a user wishes to forecast cash flows for one segment of a company for 20 quarters, Step 1180 is repeated until financial statements and cash flows have been determined for each of the 20 periods. Step 1190 then passes control back to Step 1170. Step 1170 then repeats Steps 1180 and 1190 until the required number of operating segment cash flows have been determined for each operating segment in the company. Step 1170 then passes control to Step 1200. If a company has bond issues, Step 1210 determines cash flows for the required number of periods for one bond. Step 1200 then repeats Step 1210 for each bond issue. When cash flows have been determined for each bond issue for a company Step 1200 passes control to Step 1220.

In Step 1220 the cash flows for each segment and each bond issue of a company are summed, to determine total cash flows for one company for the required number of periods, such as 20 quarters. As described before with respect to bonds, those cash flows are then adjusted for expected inflation under the initial set of economic conditions. Step 1230 repeats Steps 1170 through 1220 until cash flows are determined for each of the sets of economic conditions for one company. Step 1230 then passes control to Step 1240, which repeats Steps 1170 through 1230 until a set of cash flows for each set of economic conditions is determined for each company. Step 1240 then passes control to Step 1250 which determines company NPVs and simulated returns, index NPVs and returns, and company betas, as previously described with respect to bonds in Steps 680 through 750. Step 1250 then passes control to Step 1260.

In Step 1260, the difference between the input and output betas are considered to determine whether the process is in equilibrium. If the difference is relatively small, the process is in equilibrium and the process continues to Step 1290, otherwise the process continues to Step 1270 whether the input beta for the next iteration of the process is adjusted and the process loops back to Step 1170. Blocks 1170 through 1250, or Step 1250 is repeated until Step 1260 determines that the process is in equilibrium, i.e., the difference between the input beta and the output beta is relatively small.

In a rather simplistic embodiment of the invention, the process will loop back from Step 1270 to Step 1250. In a more advanced embodiment, however, the process will loop back from Step 1270 to Step 1170 since a more skilled user may prefer to have some cash flows depend on the company's beta. For example, if a company expects to sell stock, the price of the stock should depend on that company's beta. An analyst may wish to have the set of financial statements determined in Step 1180 depend on the input beta from Step 1270. As another example, if a company expects to issue or retire bonds, the price should also depend on the company's beta. In practice, this portion of the iterative process can become extremely complex, or may be implemented in a relatively simple manner. As should be evident, this aspect of the process may be implemented based upon one or more conventional methods.

Once the difference between the input betas and the output betas is relatively small, the process is in equilibrium, and Step 1260 passes control to Step 1290. Unlike bonds, where repayment of the principal is the final cash flow, stocks (companies) do not have a final cash flow unless there occurs a bankruptcy, an acquisition, or other abnormal termination of the relation between the company and its shareholders. For that reason it is necessary to place a value on the company as of the last period for which cash flows are forecast. For example, if a user forecasts cash flows for five years for a company, the final cash flow is the value of the company five years in the future, after allowing for all projected operating, financing, and investing activity between the then-current date and the end of the fifth year. There are many conventional techniques for establishing a terminal value of a company, and most can be incorporated in the illustrated process of the invention. Such methods may require additional iterations, and Step 1290 passes control to Step 1300 where such iterations may be performed by repeating Steps 1170 through 1270, or Steps 1250 through 1270. For example, the terminal value can be set equal to a firm's estimated accounting book value as of the terminal date.

Blocks 1290 and 1300 may also be used in a more complex iterative process whereby the ratio of the current value of the company to the book value of the company at the present (market-to-book value ratio) is assumed to be the same for a company five years in the future (or for however long cash flows are being projected). That ratio is then multiplied by the projected book value of the company at the end of the fifth year to establish a terminal cash flow. There are more advanced methods of using this feature, such as estimating the value of the company in three years and comparing it with the projected book value in three years and then using that market-to-book value ratio to establish a final cash flow. Such a method might be used if the risk of the company, and most likely its market-to-book value ratios, is expected to change significantly. Such a process involving market-to-book value ratios, however, must be used with caution since it may result in an unstable system under certain conditions. There are other well known methods of estimating a terminal value, and most can be incorporated by this invention.

Step 1290 passes control to Step 1310, which corresponds to Step 780 of FIG. 5. Step 1310 compares the total estimated company asset values with their total market values. If the difference is greater than a predetermined acceptable amount, Step 1320 adjusts the market risk premium and the process repeats Blocks 1170 through 1320 [or Blocks 1250 through 1320 if cash flows are not affected by the risk measure until the difference is less than the predetermined acceptable amount. Step 1210 then passes control to Step 1330.

In Step 1330 the process tests for other limits, such as a default risk premium on a company's bonds, which can depend on accounting ratios, projected cash flows, or a complex iterative process that can consist of valuing the company both with and without debt. In addition, Step 1330 can be used by the user for a variety of useful applications.

For example, a user may wish to learn how sensitive particular assets are to changes in a specific economic variable or variables. In such a case, Step 1330 may be used to determine asset values under a variety of economic conditions so that a portfolio of assets can be constructed that is not particularly sensitive to any single economic variable.

As another alternate use of Step 1330, many different types of assets can be combined, such as bonds, stocks, and real estate. Such a group of assets can be combined to determine one market risk premium for all the assets and to determine estimated values for all the assets. In yet another alternative embodiment, one may assume that one group of assets, such as Treasury bonds, are correctly priced, and may select a market risk premium that reduces the difference between total estimated Treasury bond values and total Treasury bond prices to a very small numbers. Simulated returns for other assets can then be regressed against a market index of Treasury bonds. Because the process is so flexible, and because the expected pricing relations are linear, there is a wide range of choice in implementing the process of the invention.

As yet another alternative use of Step 1330, the process may be implemented using assets from different countries. Although this is more complex, since it involves the use of foreign exchange rates, many conventional methods exist for relating interest rates and foreign exchange rates. Step 1330 then passes control to Step 1350, for providing the output determined measures to the output device. The portfolio may then be created in accordance with the output measures as in step 1352.

Referring to FIG. 11, there is illustrated by way of example the type of information that may be input to determine projected cash flows for a company, as in Step 1180. Block 1360 illustrates a simple projected income statement for t periods. Block 1360 sets forth typical variables that comprise net income. Revenue is obtained by applying estimated economic variables to an estimated function for revenue. For example, assume the variable that most affects a particular company's revenue is industrial production and an analyst expects industrial production to increase four percent annually. Also assume: (1) a firm's revenue is expected to grow at one percent annually, irrespective of the growth in industrial production, plus 1.5 times the growth in industrial production; and (2) base income for the firm is $10 million. In the first year expected revenue would be $10 million multiplied by 1.07 (one percent growth plus 1.5 times four percent growth). That process is repeated for each of the t periods for which revenue, expenses, and income are estimated.

Variable costs are normally estimated as a percent of revenue while fixed costs are estimated at some constant number over a range of sales. The function might also specify when fixed costs are to increase, such as when sales exceed some number, and the amount by which said fixed costs increase. Variable and fixed costs are subtracted from revenue to determine operating income, a number that many analysts find useful, and that some analysts might use in an iterative process.

The statement illustrated in FIG. 11 also shows Interest expense, which can be described as a function of several variables, including debt required to fund a company's operations, the risk-free rate of interest, and the default risk. According to a preferred embodiment of the invention, there is included an option such that a user can choose a more simplified income statement than illustrated in FIG. 11, or one more complex.

FIG. 12 illustrates a typical balance sheet which may be used to determine the investment and financing needed to support each of a firm's t income statements as illustrated in FIG. 11 and shown with respect to Step 1180 of the process. As with the income statement of FIG. 11, a user would specify functions for each variable listed in the balance sheet, plus an initial value for each variable (initial values are entered for forecast period 0, although in some cases several previous values may be included because a user may specify that the value of a variable depends on the value of a different variable from earlier periods). As examples of functions for balance sheet variables, a firm might require: (1) twenty cents of current assets for every dollar of sales; (2) fifty cents of fixed assets for every dollar of costs; and (3) one dollar of equity for every dollar of liabilities. As with the income statement illustrated in FIG. 11, according to a preferred embodiment of the invention, there will be included an option such that a user may select a balance sheet which is more simple or more complex than that shown in FIG. 12.

FIG. 13 illustrates a typical statement of cash flows for t periods for each company, as might be used in conjunction with Step 1220. In general, a statement of cash flows can be derived from an income statement and a balance sheet. According to a preferred embodiment of the invention, however, there is provided an option for a user to use a cash flow statement to specify when dividends should be paid and the size of the dividend. Although well known and conventional methods exist for such a process, there is considerable subjectivity in applying the methods. As an example, a user might expect one company to pay constant dividends unless earnings increase or decrease by at least 30%; that same user may expect another company to pay constant dividends unless earnings increase or decrease by at least 10%. Historical data may be used to determine a company's financing behavior.

FIG. 14 illustrates a typical summary of cash flow information from FIGS. 11, 12 and 13 which are needed to determine a company's estimated NPV, as used in conjunction with Step 1220 and Step 1250 of the process of the invention. As illustrated in FIG. 14, the cash dividends for the t forecast periods, plus the terminal value of the firm's equity (value of its equity in forecast period t), are used to determine the firm's: (1) cash flow to investors; (2) inflation-adjusted cash flow to investors, and (3) estimated NPV. In the case of a bond, interest payments replace dividends and the principal to be paid on the bond's maturity date replaces the value of terminal equity. Thus, for a bond, a simple input such as 8% coupon rate, Jun. 15, 1995, maturity is sufficient to determine the cash flows, as opposed to the information required in FIGS. 11, 12, 13 and 14 for companies or for physical assets, such as real estate or a piece of equipment.

In reference to step 140 of FIG. 1; 300 of FIG. 2; 770 of FIG. 5 and 1270 of FIG. 10; there are numerous ways to choose a new risk measure $\beta$ for each asset. One easy method is to assign all assets an input $\beta$ of 1.0. Next, regress the resulting simulated asset returns against the simulated index returns to obtain an output $\beta$ for each asset. Then choose a new input risk measure that lies mid-way between the most recent input $\beta$ and the most recent output $\beta$. (It is noted that the initial difference between an input and output $\beta$ may be 0.5; the final difference may be 0.000001). After about 10 iterations, convergence is usually obtained. In some cases it is necessary to return to the initial settings ($\beta$ of 1.0 for all assets) and then choose a new input risk measure that equals the previous input risk measure plus 0.4 times (or 0.3 times) the difference between the previous input risk measure and the previous output risk measure.

In come cases the difference between the input and output risk measure increases with each iteration. In that case it may be necessary to choose a new input risk measure that leapfrogs the output risk measure. Thus, if the input risk measure is 1.5, the output risk measure is 1.9, a new input risk measure may be chosen as 1.7, which results in an output risk measure of 2.0 (instead of perhaps 1.85 as might be expected). It this case, it might be necessary to choose a new input risk measure of 2.1. The converged value of that risk measure may be 1.4. In some complex assets, it is possible that a solution may not be found by incrementing all assets in the same loop, and it may be necessary to increment the $\beta$ for one asset at a time.

There are well-known convergence algorithms available for achieving convergence with the market risk premium and the long-term inflation rate. Standard zero-of-a-function algorithms such as the Golden Section and Brent's method are examples and are available in Press, *Numerical Recipes In C: The art of Scientific Computing*.

For most bonds, cash flows are set by contractual agreement. A change in the risk measure ($\beta$) does not change cash flows so it is not necessary to recalculate the cash flows as seen in FIGS. 1, 2 and 5. In such cases, all that is necessary is to discount the inflation-adjusted cash flows using a new discount rate that has changed because $\beta$ has changed. For equity assets, such as companies, stocks etc. a change in $\beta$ does change the cash flows and thus it is necessary to recalculate the cash flows as seen in the loop to step 1170 after steps 1270 and 1280 in FIG. 10.

As is evident from the description above, one may "create" a portfolio by initially buying (or deciding not to buy) assets or by modify an existing portfolio (by buying, or determining not to buy, or selling, or determining not to sell, selected assets). As used in the claims herein, the term "creating" implies both building a portfolio from scratch as well as modifying an existing portfolio. The portfolio can be created based on the idea that some bonds assets are overpriced (in which case they might be sold from the portfolio or not purchased for the portfolio) and some assets are underpriced (in which case they might be purchased for the portfolio).

The above processes, which are described for bonds and stocks, can readily be applied to most assets, including derived assets (for example, the simulated variances from the iterative process may be of value in valuing options). In addition to the described use to value assets and measure risk, the process can be incorporated into economic or econometric models or processes and can be used by companies or other organizations to evaluate operating and financing alternatives.

What is claimed is:

1. A data processing system for providing an indication of an output risk measure using jointly determined risk measures for a plurality of assets comprising:
    (a) a computer processor including:
        1) a first storage device for storing a computer program;
        2) a second storage device for storing data corresponding to a plurality of variables, including:
            (i) data corresponding to a set of economic variables including a risk premium, and
            (ii) for each asset, data corresponding to a set of asset-specific variables including an input risk measure;
        3) a central processing unit for processing data stored in said second storage device in accordance with said computer program stored in said first storage device;
        4) an input device operable for entering said data for storage in said second storage device, and
        5) an output device operable to provide an output of the results of said central processing unit;
    (b) said computer processor operable under control of said computer program to carry out the following steps:
        1) processing said data corresponding to said set of economic variables and said data corresponding to said set of asset-specific variables to determine initial cash flows for each of said plurality of assets;
        2) generating alternate data corresponding to said plurality of economic and asset-specific variables;
        3) processing said alternate data to determine corresponding alternate cash flows for each of said plurality of assets;
        4) processing said data corresponding to said set of economic variables, said data corresponding to said set of asset-specific variables and said initial cash flows to determine an initial value for each of said plurality of assets and processing said alternate data and said alternate cash flows to determine an alternate value for each of said plurality of assets;
        5) processing said initial values and said alternate values to determine a simulated asset return for each of said assets;
        6) processing at least one of said initial values and at least one of said alternate values to determine a simulated index return;
        7) jointly processing said simulated asset return and said simulated index return to determine said output risk measure for each of said assets; and
        8) using a iterative converging process, comparing a value of said input risk measures and said output risk measures to determine whether said output risk measures are within a first predetermined acceptable range, and in response thereto either:
            (i) if at least one said output risk measure is not within said first predetermined acceptable range, determine and substitute a new value for said input risk measure and use said new value for said input risk measure to process data according to steps (b) 4)–8), or
            (ii) if said output risk measures are within said first predetermined acceptable range, then provide an indication of said output risk measure on said output device.

2. A data processing system as claimed in claim 1, wherein at least one of said plurality of assets has a known market value, and wherein said computer processor is operable under control of said computer program to carry our the following additional step:
    9) determining a difference between said initial value and the known market value of at least one of said assets to determine whether said difference is within second predetermined acceptable range, and in response thereto either:
        (i) if said difference is not within said second predetermined acceptable range, determine and substitute a new value for said risk premium and use said new value of said risk premium to process data according to steps (b) 4)–9), or
        (ii) if said difference is within said second predetermined acceptable range, then the value of said output risk premium represents the risk premium determined by said data processing system; and
    (d) means for creating a portfolio of assets in accordance with said risk premium determined by said data processing system.

3. A data processing system as claimed in claim 1 wherein at least two of said plurality of assets have a known market value, and wherein said economic variables further includes an inflation rate, and wherein said computer processor is operable under control of said computer program to carry out the following additional steps:

9) processing said data corresponding to said set of economic variables, including said inflation rate, and said data corresponding to said set of asset-specific variables to determine an initial value for each of said plurality of assets and processing said alternate data to determine an alternate value for each of said plurality of assets; and 10) determining a measure of a differences between the initial value and the respective known market value of at least two of said assets to determine whether said measure is within a third predetermined acceptable range, and in response thereto either:

(i) if said measure is not within said third predetermined acceptable range, determine and substitute a new value for said inflation rate and use said new value of said inflation rate to process data according to steps (b) 4)–10), or (ii) if said measure is within said third predetermined acceptable range, then the value of said output inflation rate represents the inflation rate determined by said data processing system; and (e) means for creating a portfolio of assets in accordance with said inflation rate determined by said data processing system.

4. A data processing system for providing an indication of an output risk measure using jointly determined risk measures for a plurality of assets comprising:

(a) a computer processor including:
1) a first storage device for storing a computer program;
2) a second storage device for storing data corresponding to a plurality of variables, including:
(i) data corresponding to a set of economic variables including a risk premium, and
(ii) for each asset, data corresponding to a set of asset-specific variables including an input risk measure;
3) a central processing unit for processing data stored in said second storage device in accordance with said computer program stored in said first storage device;
4) an input device operable for entering said data for storage in said second storage device, and
5) an output device operable to provide an output of the results of said central processing unit;

(b) said computer processor operable under control of said computer program to carry out the following steps:
1) processing said data corresponding to said set of economic variables and said data corresponding to said set of asset-specific variables to determine initial cash flows for each of said plurality of assets;
2) generating a plurality of sets of alternate data, each set of which corresponds to said plurality of economic and asset-specific variables;
3) processing said plurality of sets of alternate data to determine a corresponding plurality of sets of alternate cash flows for each of said plurality of assets;
4) processing said data corresponding to said set of economic variables, said data corresponding to said set of asset-specific variables and said initial cash flows to determine an initial value for each of said plurality of assets and processing said plurality of sets of alternate data and said plurality of sets of alternate cash flows to determine an alternate value for each of said plurality of assets;
5) processing said initial values and said plurality of sets of alternate values to determine a plurality of simulated asset returns for each of said assets;
6) processing at least one of said initial values and at least one of said plurality of sets of alternate values to determine a plurality of simulated index returns;
7) processing said plurality of simulated asset returns and said plurality of simulated index returns to determine said output risk measure for each of said assets; and
8) using an iterative converging process, comparing a value of said input risk measures and said output risk measures to determine whether said output risk measures are within a first predetermined acceptable range, and in response thereto either:

(i) if at least one said output risk measure is not within said first predetermined acceptable range, determine and substitute a new value for said input risk measure and use said new value for said input risk measure to process data according to steps (b) 4)–8), or (ii) if said output risk measures are within said first predetermined acceptable range, then provide an indication of said output risk measure on said output device.

5. A data processing system as claimed in claim 4, wherein at least one of said plurality of assets has a known market value, and wherein said computer processor is operable under control of said computer program to carry our the following additional step:

9) determining a difference between said initial value and the known market value of at least one of said assets to determine whether said difference is within second predetermined acceptable range, and in response thereto either:

(i) if said difference is not within said second predetermined acceptable range, determine and substitute a new value for said risk premium and use said new value of said risk premium to process data according to steps (b) 4)–9), or (ii) if said difference is within said second predetermined acceptable range, then the value of said output risk premium represents the risk premium determined by said data processing system; and (d) means for creating a portfolio of assets in accordance with said risk premium determined by said data processing system.

6. A data processing system as claimed in claim 4 wherein at least two of said plurality of assets have a known market value, and wherein said economic variables further includes an inflation rate, and wherein said computer processor is operable under control of said computer program to carry out the following additional steps:

9) processing said data corresponding to said set of economic variables, including said inflation rate, and said data corresponding to said set of asset-specific variables to determine an initial value for each of said plurality of assets and processing said plurality of sets of alternate data to determine a plurality of alternate values for each of said plurality of assets; and 10) determining a measure of a differences between the initial value and the respective known market value of at least two of said assets to determine whether said measure is within a third predetermined acceptable range, and in response thereto either:

(i) if said measure is not within said third predetermined acceptable range, determine and substitute a new value for said inflation rate and use said new value of said inflation rate to process data according to steps (b) 4)–9), or (ii) if said measure is within said third predetermined acceptable range, then the value of said output inflation rate represents the inflation rate determined by said data processing system; and (e) means for creating a portfolio of assets in accordance with said inflation rate determined by said data processing system.

7. A data processing system as claimed in claim 4 wherein computer processor is operable under control of said computer program to carry out the following additional step:

9) determines an output risk measure for each of said assets by, for each asset, regressing said plurality of simulated asset returns against said plurality of simulated index returns.

8. A data processing system as claimed in claim 4 wherein said initial cash flows have been determined up to a predetermined and specific terminal date and wherein at least one of said plurality of assets has value beyond the said terminal date, said computer processor operable under control of said computer program to carry out the following additional steps:

9) processing said data corresponding to said set of economic variables and said data corresponding to said set of asset-specific variables to determine an initial value for each of said plurality of assets and processing said plurality of sets of said alternate data to determine a plurality of alternate values for each of said plurality of assets; and 10) determining the difference between two ratios wherein:

(i) said first ratio is a market value of said asset at said terminal date divided by a book value of said asset at said terminal date, and (ii) said second ratio is said asset's market value at a date prior to said terminal date divided by said asset's book value at said date prior to said terminal date, to determine whether said difference is within a second predetermined acceptable range, and in response thereto either:

(i) if said difference is not within said second predetermined acceptable range, determine and substitute a now value for said market value at said terminal date and use said new value of said market value to process data according to steps (b) 4)–10), or (ii) if said difference is within said second predetermined acceptable range, then the value of said output risk measures represent the risk measures determined by said data processing system.

9. A data processing system as claimed in claim 4 wherein at least one of said plurality of assets has debt and includes an asset-specific variable of an input default risk premium for said asset's debt, and wherein said computer processor is operable under control of said computer program to carry our the following additional steps: system further comprising:

9) determining a default risk premium corresponding to said asset with debt;

10) determining a difference between said input default risk premium and the default risk premium to determine whether said difference is within a second predetermined acceptable range, and in response thereto either:

(i) if said difference is not within said second predetermined acceptable range, determine and substitute a new value for said initial default risk premium and use said value of said default risk premium to process data according to steps (b) 4)–9), or (ii) if said difference is within said predetermined acceptable range, then the value of said default risk premium represents the default risk premium determined by said data processing system;

(c) means for creating a portfolio of assets in accordance with said default risk premium determined by said data processing system.

10. A data processing system, as claimed in claim 5 wherein for a first set of at least one of said plurality of assets there is a first risk premium which corresponds to the risk premium determined in step 9) and for a second set of at least one other of said plurality of assets a second risk premium the value of which is input, and wherein said computer processor is operable under control of said computer program to carry our the following additional steps:

10) determining the risk measure of said second set of assets with respect to said first set of assets;

11) determining a ratio of said second risk premium and said first risk premium to determine whether the difference between said ratio and said risk measure determined in step 10) is within a third predetermined acceptable range, and in response thereto either:

(i) if said difference is not within said third predetermined acceptable range, determine and substitute a new value for said second risk premium and use said new value of said second risk premium to process data in accordance with steps (b) 4)–11), or (ii) if said difference is within said third predetermined acceptable range, then the value of said second risk premium represents the risk premium determined by said data processing system;

(d) means for creating a portfolio of assets in accordance with said second risk premium determined by said data processing system.

11. A data processing system as claimed in claim 1 wherein said initial cash flows have been determined up to a predetermined and specific terminal date and wherein at least one of said plurality of assets has value beyond the said terminal date, said computer processor operable under control of said computer program to carry out the following additional steps:

9) processing said data corresponding to said set of economic variables and said data corresponding to said set of asset-specific variables to determine an initial value for each of said plurality of assets and processing said plurality of sets of said alternate data to determine a plurality of alternate values for each of said plurality of assets; and 10) determining a difference between two ratios wherein:

(i) said first ratio is a market value of said asset at said terminal date divided by a book value of said asset at said terminal date, and (ii) said second ratio is said asset's market value at a date prior to said terminal date divided by said asset's book value at said date prior to said terminal date, to determine whether said difference is within a second predetermined acceptable range, and in response thereto either:
  (i) if said difference is not within said second predetermined acceptable range, determine and substitute a new value for said market value at said terminal date and use said new value of said market value to process data according to steps (b) 4)–10), or
  (ii) if said difference is within said second predetermined acceptable range, then the value of said output risk measures represent the risk measures determined by said data processing system.

12. A data processing system for providing an indication of an output risk measure using jointly determined risk measures for a plurality of assets comprising:
  (a) a computer processor including:
    1) a first storage device for storing a computer program;
    2) a second storage device for storing data corresponding to a plurality of variables, including:
      (i) data corresponding to a set of economic variables including a risk premium, and
      (ii) for each asset, data corresponding to a set of asset-specific variables including an input risk measure;
    3) a central processing unit for processing data stored in said second storage device in accordance with said computer program stored in said first storage device;
    4) an input device operable for entering said data for storage in said second storage device, and
    5) an output device operable to provide an output of the results of said central processing unit;
  (b) said computer processor operable under control of said computer program to carry out the following steps:
    1) processing said data corresponding to said set of economic variables and said data corresponding to said set of asset-specific variables to determine initial cash flows for each of said plurality of assets;
    2) generating alternate data corresponding to said plurality of economic and asset-specific variables;
    3) processing said alternate data to determine corresponding alternate cash flows for each of said plurality of assets;
    4) processing said data corresponding to said set of economic variables, said data corresponding to said set of asset-specific variables and said initial cash flows to determine an initial value for each of said plurality of assets and processing said alternate data and said alternate cash flows to determine an alternate value for each of said plurality of assets;
    5) processing said initial values and said alternate values to determine a simulated asset return for each of said assets;
    6) processing at least one of said initial values and at least one of said alternate values to determine a simulated index return;
    7) jointly processing said simulated asset return and said simulated index return to determine said output risk measure for each of said assets; and
    8) using an iterative converging process, comparing a value of said input risk measures and said output risk measures to determine whether said output risk measures are within a first predetermined acceptable range, and in response thereto either:
      (i) if at least one said output risk measure is not within said first predetermined acceptable range, determine and substitute a new value for said input risk measure and use said new value for said input risk measure to process data according to steps (b) 1)–8), or
      (ii) if said output risk measures are within said first predetermined acceptable range, then provide an indication of said output risk measure on said output device.

13. A data processing system as claimed in claim 12, wherein at least one of said plurality of assets has a known market value, and wherein said computer processor is operable under control of said computer program to carry our the following additional step:
    9) determining a difference between said initial value and the known market value of at least one of said assets to determine whether said difference is within second predetermined acceptable range, and in response thereto either:
      (i) if said difference is not within said second predetermined acceptable range, determine and substitute a new value for said risk premium and use said new value of said risk premium to process data according to steps (b) 1)–9), or
      (ii) if said difference is within said second predetermined acceptable range, then the value of said output risk premium represents the risk premium determined by said data processing system; and
  (d) means for creating a portfolio of assets in accordance with said risk premium determined by said data processing system.

14. A data processing system as claimed in claim 12 wherein at least two of said plurality of assets have a known market value, and wherein said economic variables further includes an inflation rate, and wherein said computer processor is operable under control of said computer program to carry out the following additional steps:
    9) processing said data corresponding to said set of economic variables, including said inflation rate, and said data corresponding to said set of asset-specific variables to determine an initial value for each of said plurality of assets and processing said alternate data to determine an alternate value for each of said plurality of assets; and
    10) determining a measure of a differences between the initial value and the respective known market value of at least two of said assets to determine whether said measure is within a third predetermined acceptable range, and in response thereto either:
      (i) if said measure is not within said third predetermined acceptable range, determine and substitute a new value for said inflation rate and use said new value of said inflation rate to process data according to steps (b) 1)–10), or
      (ii) if said measure is within said third predetermined acceptable range, then the value of said output inflation rate represents the inflation rate determined by said data processing system; and
  (e) means for creating a portfolio of assets in accordance with said inflation rate determined by said data processing system.

15. A data processing system for providing an indication of an output risk measure using jointly determined risk measures for a plurality of assets comprising:
  (a) a computer processor including:
    1) a first storage device for storing a computer program;
    2) a second storage device for storing data corresponding to a plurality of variables, including:
      (i) data corresponding to a set of economic variables including a risk premium, and (ii) for each asset, data corresponding to a set of asset-specific variables including an input risk measure;

3) a central processing unit for processing data stored in said second storage device in accordance with said computer program stored in said first storage device;

4) an input device operable for entering said data for storage in said second storage device, and 5) an output device operable to provide an output of the results of said central processing unit;

(b) said computer processor operable under control of said computer program to carry out the following steps:

1) processing said data corresponding to said set of economic variables and said data corresponding to said set of asset-specific variables to determine initial cash flows for each of said plurality of assets;

2) generating a plurality of sets of alternate data, each set of which corresponds to said plurality of economic and asset-specific variables;

3) processing said plurality of sets of alternate data to determine a corresponding plurality of sets of alternate cash flows for each of said plurality of assets;

4) processing said data corresponding to said set of economic variables, said data corresponding to said set of asset-specific variables and said initial cash flows to determine an initial value for each of said plurality of assets and processing said plurality of sets of alternate data and said plurality of sets of alternate cash flows to determine an alternate value for each of said plurality of assets;

5) processing said initial values and said plurality of sets of alternate values to determine a plurality of simulated asset returns for each of said assets;

6) processing at least one of said initial values and at least one of said plurality of sets of alternate values to determine a plurality of simulated index returns;

7) jointly processing said plurality of simulated asset returns and said plurality of simulated index returns to determine said output risk measure for each of said assets; and 8) using an iterative converging process, comparing a value of said input risk measures and said output risk measures to determine whether said output risk measures are within a first predetermined acceptable range, and in response thereto either:

(i) if at least one said output risk measure is not within said first predetermined acceptable range, determine and substitute a new value for said input risk measure and use said new value for said input risk measure to process data according to steps (b) 1)–8), or (ii) if said output risk measures are within said first predetermined acceptable range, then provide an indication of said output risk measure on said output device.

16. A data processing system as claimed in claim 15, wherein at least one of said plurality of assets has a known market value, and wherein said computer processor is operable under control of said computer program to carry our the following additional step:

9) determining a difference between said initial value and the known market value of at least one of said assets to determine whether said difference is within second predetermined acceptable range, and in response thereto either:

(i) if said difference is not within said second predetermined acceptable range, determine and substitute a new value for said risk premium and use said new value of said risk premium to process data according to steps (b) 1)–9), or (ii) if said difference is within said second predetermined acceptable range, then the value of said output risk premium represents the risk premium determined by said data processing system; and (d) means for creating a portfolio of assets in accordance with said risk premium determined by said data processing system.

17. A data processing system as claimed in claim 15 wherein at least two of said plurality of assets have a known market value, and wherein said economic variables further includes an inflation rate, and wherein said computer processor is operable under control of said computer program to carry out the following additional steps:

9) processing said data corresponding to said set of economic variables, including said inflation rate, and said data corresponding to said set of asset-specific variables to determine an initial value for each of said plurality of assets and processing said plurality of sets of alternate data to determine a plurality of alternate values for each of said plurality of assets; and 10) determining a measure of a differences between the initial value and the respective known market value of at least two of said assets to determine whether said measure is within a third predetermined acceptable range, and in response thereto either:

(i) if said measure is not within said third predetermined acceptable range, determine and substitute a new value for said inflation rate and use said new value of said inflation rate to process data according to steps (b) 1)–9), or (ii) if said measure is within said third predetermined acceptable range, then the value of said output inflation rate represents the inflation rate determined by said data processing system; and (e) means for creating a portfolio of assets in accordance with said inflation rate determined by said data processing system.

18. A data processing system as claimed in claim 15 wherein computer processor is operable under control of said computer program to carry out the following additional step:

9) determines an output risk measure for each of said assets by, for each asset, regressing said plurality of simulated asset returns against said plurality of simulated index returns.

19. A data processing system as claimed in claim 15 wherein said initial cash flows have been determined up to a predetermined and specific terminal date and wherein at least one of said plurality of assets has value beyond the said terminal date, said computer processor operable under control of said computer program to carry out the following additional steps:

9) processing said data corresponding to said set of economic variables and said data corresponding to said set of asset-specific variables to determine an initial value for each of said plurality of assets and processing said plurality of sets of said alternate data to determine a plurality of alternate values for each of said plurality of assets; and 10) determining a difference between two ratios wherein:

(i) said first ratio is a market value of said asset at said terminal date divided by a book value of said asset at said terminal date, and said second ratio is said asset's market value at a date prior to said terminal date divided by said asset's book value at said date prior to said terminal date, to determine whether said difference is within a second predetermined acceptable range, and in response thereto either:
  (i) if said difference is not within said second predetermined acceptable range, determine and substitute a new value for said market value at said terminal date and use said new value of said market value to process data according to steps (b) 1)–10), or
  (ii) if said difference is within said second predetermined acceptable range, then the value of said output risk measures represent the risk measures determined by said data processing system.

20. A data processing system as claimed in claim 15 wherein at least one of said plurality of assets has debt and includes an asset-specific variable of an input default risk premium for said asset's debt, and wherein said computer processor is operable under control of said computer program to carry our the following additional steps: system further comprising:
  9) determining a default risk premium corresponding to said asset with debt;
  10) determining a difference between said input default risk premium and the default risk premium to determine whether said difference is within a second predetermined acceptable range, and in response thereto either:
    (i) if said difference is not within said second predetermined acceptable range, determine and substitute a new value for said initial default risk premium and use said value of said default risk premium to process data according to steps (b) 1)–9), or
    (ii) if said difference is within said predetermined acceptable range, then the value of said default risk premium represents the default risk premium determined by said data processing system;
  (c) means for creating a portfolio of assets in accordance with said default risk premium determined by said data processing system.

21. A data processing system, as claimed in claim 16 wherein for a first set of at least one of said plurality of assets there is a first risk premium which corresponds to the risk premium determined in step 9) and for a second set of at least one other of said plurality of assets a second risk premium the value of which is input, and wherein said computer processor is operable under control of said computer program to carry our the following additional steps:
  10) determining the risk measure of said second set of assets with respect to said first set of assets;
  11) determining a ratio of said second risk premium and said first risk premium to determine whether the difference between said ratio and said risk measure determined in step 10) is within a third predetermined acceptable range, and in response thereto either:
    (i) if said difference is not within said third predetermined acceptable range, determine and substitute a new value for said second risk premium and use said new value of said second risk premium to process data in accordance with steps (b) 1)–11), or
    (ii) if said difference is within said third predetermined acceptable range, then the value of said second risk premium represents the risk premium determined by said data processing system;
  (d) means for creating said portfolio of assets in accordance with said second risk premium determined by said data processing system.

22. A data processing system as claimed in claim 12 wherein said initial cash flows have been determined up to a predetermined and specific terminal date and wherein at least one of said plurality of assets has value beyond the said terminal date, said computer processor operable under control of said computer program to carry out the following additional steps:
  9) processing said data corresponding to said set of economic variables and said data corresponding to said set of asset-specific variables to determine an initial value for each of said plurality of assets and processing said plurality of sets of said alternate data to determine a plurality of alternate values for each of said plurality of assets; and
  10) determining a difference between two ratios wherein:
    (i) said first ratio is a market value of said asset at said terminal date divided by a book value of said asset at said terminal date, and
    (ii) said second ratio is said asset's market value at a date prior to said terminal date divided by said asset's book value at said date prior to said terminal date, to determine whether said difference is within a second predetermined acceptable range, and in response thereto either:
      (i) if said difference is not within said second predetermined acceptable range, determine and substitute a new value for said market value at said terminal date and use said new value of said market value to process data according to steps (b) 1)–10), or
      (ii) if said difference is within said second predetermined acceptable range, then the value of said output risk measures represent the risk measures determined by said data processing system.

23. A data processing method for creating a portfolio of assets using jointly determining risk measures for a plurality of assets using the system of claim 1.

* * * * *